US012697767B2

(12) United States Patent
Sappington

(10) Patent No.: US 12,697,767 B2
(45) Date of Patent: Aug. 4, 2026

(54) APPARATUS AND METHODS FOR MANUFACTURING PRODUCTS CONTAINING SEQUESTERED CARBON

(71) Applicant: Robert Grove Sappington, Sammamish, WA (US)

(72) Inventor: Robert Grove Sappington, Sammamish, WA (US)

( * ) Notice: Subject to any disclaimer, the term of this patent is extended or adjusted under 35 U.S.C. 154(b) by 46 days.

(21) Appl. No.: 18/838,565

(22) PCT Filed: Jul. 11, 2023

(86) PCT No.: PCT/US2023/070003

§ 371 (c)(1), (2) Date: Aug. 14, 2024

(87) PCT Pub. No.: WO2024/015821

PCT Pub. Date: Jan. 18, 2024

(65) Prior Publication Data

US 2025/0144870 A1 May 8, 2025

Related U.S. Application Data

(60) Provisional application No. 63/368,246, filed on Jul. 12, 2022.

(51) Int. Cl.
*B29C 64/112* (2017.01)
*B29C 64/106* (2017.01)
(Continued)

(52) U.S. Cl.
CPC .......... *B29C 64/106* (2017.08); *B29C 64/386* (2017.08); *B33Y 10/00* (2014.12); *B33Y 50/00* (2014.12); *B33Y 70/00* (2014.12)

(58) Field of Classification Search
CPC ..... B29C 64/106; B29C 64/112; B29C 64/20; B29C 64/309; B29C 64/386; B33Y 10/00; B33Y 30/00; B33Y 50/00; Y02P 20/151
(Continued)

(56) References Cited

U.S. PATENT DOCUMENTS

2020/0361224 A1* 11/2020 Navas .................... B41J 11/002
2021/0379821 A1* 12/2021 Rogren ................. B29C 64/112
(Continued)

FOREIGN PATENT DOCUMENTS

WO WO-2021209535 A1 * 10/2021 ............. B29C 64/00

*Primary Examiner* — Leo B Tentoni

(57) ABSTRACT

Apparatus and methods to mitigate climate change by capturing and sequestering greenhouse gasses (GHGs) previously emitted, adapting to the adverse effects of climate change, and reducing GHGs in the production of goods. The invention produces products containing carbon extracted from a Solution containing carbonates and/or carbonate reactants through manipulation of solution components, temperature, pressure, magnetic fields, electric charge, pH, turbulence, solution flow rate, and time in an additive or hybrid additive and formative manufacturing process. Embodiments consist of mechanisms to: deliver a Solution to an accumulation area, expose the solution to synergistic stimulation, and remove supernatant liquid. Advanced embodiments may incorporate: form(s); solution pretreatment; power generation; data collection; mechanical and computer control; cross-sectional layer construction capabilities; the addition of reactants, additives and/or carbonate-forming organisms, and massively parallel synergistic stimulation.

19 Claims, 17 Drawing Sheets

(51) Int. Cl.

| | |
|---|---|
| ***B29C 64/20*** | (2017.01) |
| ***B29C 64/209*** | (2017.01) |
| ***B29C 64/386*** | (2017.01) |
| ***B33Y 10/00*** | (2015.01) |
| ***B33Y 30/00*** | (2015.01) |
| ***B33Y 50/00*** | (2015.01) |
| ***B33Y 70/00*** | (2020.01) |

(58) Field of Classification Search
USPC .......................... 264/40.1, 308; 425/135, 375
See application file for complete search history.

(56) References Cited

U.S. PATENT DOCUMENTS

2023/0323128 A1* 10/2023 Fini ........................ B33Y 80/00
524/13
2024/0294415 A1* 9/2024 Gilmer .................. B29C 64/209

* cited by examiner

APPARATUS AND METHODS FOR MANUFACTURING PRODUCTS CONTAINING SEQUESTERED CARBON

CROSS-REFERENCE TO RELATED APPLICATIONS

This application claims the benefit of the U.S. Provisional Patent Application Ser. No. U.S. 63/368,246, filed Jul. 12, 2022, the disclosures of which are incorporated by reference in their entirety.

TECHNICAL FIELD

The invention is a technology for mitigation of climate change by sequestering greenhouse gasses (GHGs) previously emitted, adapting to the adverse effects of climate change, and reducing GHGs in the production of goods. Relevant Cooperative Patent Classification subclasses include Y02, Y02A, Y02C, and Y02P.

BACKGROUND ART

Implementations of additive and formative manufacturing techniques consider neither the use of inputs containing components incapable of solidification nor the sequestration of carbon in the manufacturing process. See, for example, Hull, U.S. Pat. No. 5,236,637, lacks a means of removing supernatant liquid or unusable material. These apparatuses use polymers as the primary solidifying agent, not Carbonates. See, for example, DeSimone et al., U.S. Pat. No. 11,141,910. Robocasting provides another example where the suitability of inputs is narrowly tailored to achieve the invention's functionality: "The properties and composition of the ink are considered to be the most important factors in robocasting. Inks must be homogenous, free of air bubbles, have a high volume fraction of ceramic powder and the correct flow properties for extrusion while capable of holding their shape after printing. An ink must be highly shear thinning to allow extrusion through fine nozzles, and also retain a degree of strength and stiffness to be self-supporting following printing. This stiffness and strength equates to a large elastic component of the ink's viscoelastic response. Aqueous inks are also preferred due to their simplicity, lower cost, low toxicity and slower drying, while low concentrations of organics are desired to allow fast burnout and high densities." Ezra Feilden, Esther García-Tuñón Blanca, Finn Giuliani, Eduardo Saiz, Luc Vandeperre; Robocasting of structural ceramic parts with hydrogel inks; Journal of the European Ceramic Society; Volume 36, Issue 10, 2016, Pages 2525-2533, ISSN 0955-2219. The invention contemplated here can utilize a wide range of input solution characteristics to sequester carbon in manufactured products; robocasting cannot.

Further, the prior art operates exclusively in traditional indoor laboratory or manufacturing settings ("Traditional Manufacturing"). The novel approach described here enables the use of solutions with some components incapable of solidifying to produce products containing Carbonates in both Traditional Manufacturing and non-traditional production settings, including (but not limited to) freshwater, saltwater, and terrestrial environments.

Sant et al. (United States Patent Application 20220040639) proposed a flow reactor design using an electrified mesh to precipitate calcium and magnesium carbonates from seawater. Their approach produces carbonate particles from seawater but can neither build more complex three-dimensional objects nor control the particulate size distribution or shape. The invention disclosed here does not utilize a mesh and is capable of producing Carbonate products with more precise characteristics and greater complexity.

An optional component of the claimed invention utilizes calciferous microorganisms in the production process. A small number of patent applications have described methods of carbon sequestration in microorganisms. See, for example, Sim et al. (U.S. Pat. No. 11,193,100), Lambert (U.S. Pat. No. 8,882,552), and Jovine (U.S. Pat. No. 8,440,439). None of these inventions use harvested or cultured organisms in an apparatus or method to produce carbonate products.

SUMMARY OF INVENTION

Technical Problem

Emissions of greenhouse gasses, such as carbon dioxide (CO.sub.2), methane (CH.sub.4), and nitrogen oxides (NO.sub.x) have caused the planet to warm, harming the environment, human health, habitability, and the global economy. Removal of carbon from the atmosphere and water bodies will help mitigate global warming effects; however, the gigaton scale of carbon removal required necessitates a novel approach capable of producing a variety of sequestered-carbon products in a wide range of production environments, including (but not limited to) a natural location. Production of a limited number of sequestered-carbon products at gigaton scale in a narrow range of manufacturing settings will outstrip human capacity to extract, use, and manage the stored carbon.

Solution to Problem

Carbon extracted from both naturally occurring and developed liquids may be sequestered in manufactured products composed in whole or in part of carbonates ("Carbonates"), including but not limited to calcium carbonate (CaCO.sub.3), magnesium carbonate (MgCO.sub.3), calcium-magnesium carbonate (CaMg(CO.sub.3).sub.2), iron carbonate (FeCO.sub.3), sodium carbonate (NaCO.sub.3), potassium carbonate (KCO.sub.3), or combinations of those carbonates. Manipulation of the relative and absolute concentrations of solution components, temperature, pressure, magnetic fields, electric charge, pH, turbulence, solution flow rate, and time may be exploited in an additive manufacturing apparatus and processes or a hybrid of additive and formative manufacturing apparatus and processes to produce products of desired sizes, shapes, and qualities. The apparatus and manufacturing processes can produce products at any scale, including (but not limited to) from nanoscale to landscape scale. Further, manufacturing may occur in situ or ex situ and in a continuous or batch process.

A basic embodiment of the apparatus consists of a Solution containing Carbonates and/or reactants producing Carbonates, a mechanism to deliver the Solution to an Accumulation Area, a mechanism for exposing the Solution to one or more source(s) of synergistic stimulation that produces one or more Manipulations, and a mechanism for removing supernatant liquid. More advanced embodiments may incorporate (but are not limited to) one or more of the following: form(s); Solution pretreatment; power generation; data collection; mechanical and computer control; cross-sectional layer construction capabilities; the addition of reactants, additives and/or carbonate-forming organisms, and massively parallel synergistic stimulation. Methods for producing three-dimensional products by synergistically stimulating a Solution containing carbonates or reactants producing carbonates are also described.

Advantageous Effects of Invention

This additive manufacturing technology will remove carbon from natural water bodies and developed solutions, mitigating climate change impacts. This technology will permanently sequester carbon directly in products that have additional uses beyond carbon storage. This multi-use approach plus the ability to manufacture directly in the environment enables carbon dioxide removal to scale to a gigaton per year.

Further, the Apparatus can use inputs, e.g. (but not limited to) naturally occurring liquids, and operate in environments, e.g. (but not limited to) natural environments, that other additive manufacturing technologies cannot. Thus, this technology enables use of unused resources and manufacturing locations.

The Apparatus' flexible capabilities enable production of a variety of products including (but not limited to) aquatic land improvement products, such as aquaculture structures, breakwaters, and artificial islands and reefs; beach replenishment; industrial feedstocks; and building materials.

BRIEF DESCRIPTION OF DRAWINGS

Arrows with filled arrowheads show a relationship between two components in the figure. The filled-head arrows indicate only that a relationship exists; these arrows do not describe the nature of the relationship, e.g. no directionality implied. Dashed lines show optional components.

FIG. 16 illustrates the intake housing and intake opening facing away from the Solution's flow, and the flow acting upon the current-directed surface to turn the intake housing so that the intake opening receives Solution.

DESCRIPTION OF EMBODIMENTS

Figure 1:
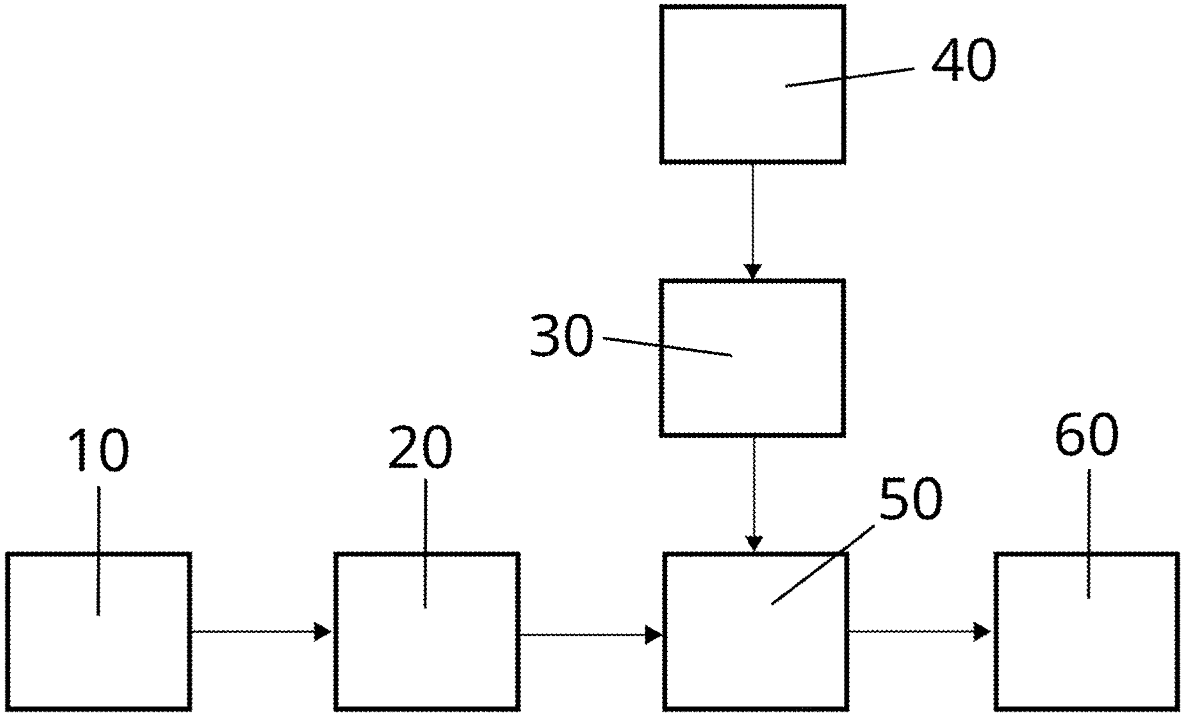
FIG. 1 shows the block diagram of a simple embodiment of the apparatus for creating products containing sequestered carbon derived from naturally occurring or developed Solutions.

The invention is described with reference to the accompanying drawings, in which embodiments of the invention are shown. This invention may, however, be embodied in many different forms and should not be construed as limited to the embodiments set forth; rather these embodiments convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise. The terminology used describes particular embodiments only and is not intended to limit the invention. The singular forms "a," "an" and "the" include plural forms as well, unless the context clearly indicates otherwise. The terms "comprises" or "comprising," when used in this specification, specify the presence of stated features, integers, steps, operations, elements components and/or groups or combinations, but do not preclude the presence or addition of one or more other features, integers, steps, operations, elements, components and/or groups or combinations.

The term "and/or" includes any and all possible combinations or one or more of the associated listed items, as well as the lack of combinations when interpreted in the alternative ("or").

Unless otherwise defined, all terms (including technical and scientific terms) used have the same meaning as commonly understood by one of ordinary skill in the art to which this invention belongs. Terms, such as those defined in commonly used dictionaries, should be interpreted as having a meaning that is consistent with their meaning in the context of the specification and claims and should not be interpreted in an idealized or overly formal sense unless expressly so defined. Well-known functions or constructions may not be described in detail for brevity and/or clarity.

When an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. References to a structure or feature that is "adjacent" to another feature can have portions that overlap or underlie the adjacent feature.

Spatially relative terms, such as "under," "below," "lower," "over," "upper" and the like, may be used for ease of description to describe an element's or feature's relationship to another element(s) or feature(s) as illustrated in the figures. The spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may otherwise be oriented (rotated 90 degrees or at other orientations) and the spatially relative descriptors interpreted accordingly. Similarly, the terms "upwardly," "downwardly," "vertical," "horizontal" and the like are used for the purpose of explanation only, unless specifically indicated otherwise.

Although the terms first, second, etc., may be used herein to describe various elements, components, regions, layers and/or sections, these elements, components, regions, layers and/or sections should not be limited by those terms. Rather, those terms are used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. All examples are non-limiting.

Carbon extracted from both naturally occurring and developed liquids may be sequestered in manufactured products composed in whole or in part of carbonates ("Carbonates"), including but not limited to: calcium carbonate (CaCO.sub.3), magnesium carbonate (MgCO.sub.3), calcium-magnesium carbonate (CaMg(CO.sub.3).sub.2), iron carbonate (FeCO.sub.3), sodium carbonate (NaCO.sub.3), potassium carbonate (KCO.sub.3), or combinations of those carbonates. Solutions containing carbon dioxide (CO.sub.2) and other reactants, including (but not limited to) intermediary molecules such as carbonic acid (H.sub.2CO.sub.3) and the carbonate ion (CO.sub.3), and calcium (Ca), magnesium (Mg), iron (Fe), sodium (Na), potassium (K), and/or other elements may be used to produce those Carbonates in manufacturing processes that yield products of desired compositions, shapes, and sizes.

A representative set of chemical reactions that create Carbonates are summarized as follows.

Calcium Carbonate:

Ca(OH).sub.2 + CO.sub.2.fwdarw.H.sub.2O + CaCO.sub.3 (precipitate)

Magnesium Carbonate:

Mg(OH).sub.2 + 2(CO.sub.2).fwdarw.Mg(HCO.sub.3).sub.2.fwdarw.MgCO.sub.3 + CO.sub.2 + H.sub.2O Calcium-Magnesium Carbonate:

2 CaCO3 + Mg2 + .fwdarw.CaMg(CO.sub.3).sub.2 + Ca.sup.2 +

Iron Carbonate:

Fe + CO.sub.2 + H.sub.2O.fwdarw.FeCO.sub.3 + H.sub.2

Sodium Carbonate:

2NaHCO.sub.3.fwdarw.Na.sub.2CO.sub.3 + CO.sub.2 + H.sub.2O

Sodium Bicarbonate:

NaCl + NH.sub.3 + CO.sub.2 + H.sub.2O.fwdarw.NaHCO.sub.3. + NH.sub.4Cl

Potassium Carbonate:

$$2KOH + CO_2 \rightarrow K_2CO_3 + H_2O$$

Factors affecting these reactions include (but are not limited to): relative and absolute concentrations of solution components, temperature, pressure, magnetic fields, electric charge, pH, turbulence, solution flow rate, time, and carbonate-producing organisms.

These factors may be manipulated (the Manipulations) in novel manufacturing processes. The Manipulations may be performed in isolation or in combinations and permutations. Manipulation(s) may produce synergies. For example (but not limited to), heating a contained solution increases pressure.

People of ordinary skill in the art understand the carbonate physics and chemistry underlying these Manipulations. The novel application of these Manipulations in new apparatuses and methods described here advance the state of the art. Several non-limiting examples illustrate the effects of Manipulations to provide context for their use. The examples described here are not a complete description of all Manipulations, but rather an illustrative subset. Numerical values provide non-limiting examples of Manipulation reaction points. Many feasible values for a Manipulation exist in isolation or in combination with one or more other Manipulations.

The amounts of Carbonates and Carbonate reactants in solution affect product formation according to Le Chatelier's principle. The effect of adding $CO_2$ to a solution as a reactant depends upon the solution's initial equilibrium state. For example, the addition of $CO_2$ to a suspension containing calcium carbonate will increase dissolution of the carbonate while the addition of $Ca(OH)_2$ to solution saturated with $CO_2$ induces calcium carbonate formation. Adding $CO_2$ and ammonia to a brine solution produces sodium bicarbonate and ultimately sodium carbonate in the Solvay process. Adding Zinc to a solution enhances magnesium carbonate precipitation.

Temperature may be used to manufacture Carbonates. The required temperature varies with the solution used and the product desired due to differences in precipitation and decomposition thresholds for the various Carbonates. For example, calcium carbonate precipitates at temperatures ranging from ambient to greater than 1200 degrees Celsius. The precipitate is polymorphic and may exist as anhydrated forms, such as calcite, aragonite, and vaterite, or hydrated forms, such calcium carbonate monohydrate ($CaCO_3H_2O$) and calcium carbonate hexahydrate ($CaCO_36H_2O$). In the presence of Mg, dolomite ($CaMg(CO_3)_2$) may form. Physical properties of calcium carbonate polymorphs vary. Calcite has a density of 2.711 grams per cubic cm and a melting point of 1339 degrees Celsius. Aragonite has a density of 2.88 grams per cubic cm and a melting point of 825 degrees Celsius. While calcium carbonate polymorphs may precipitate at ambient temperatures, a particular form may be favored under certain conditions, such as but not limited to temperature or the presence of other elements, like Mg. Magnesium carbonate begins to precipitate at ambient temperature and decomposes between 350 and 900 degrees Celsius. Iron carbonate precipitates at ambient temperatures up to 200 degrees Celsius at which decomposition begins. Dolomite aggregates can form at ambient temperature; however, increasing operating temperatures to 40 degrees Celsius to 200 degrees Celsius enhances dolomite precipitation. Iron carbonate precipitation rate proceeds slowly at ambient temperature, peaks around 80 degrees Celsius, and declines in rate thereafter until its melting point of about 334 degrees Celsius. Sodium bicarbonate converts to sodium carbonate through Hou's Process at 80 degrees Celsius to 95 degrees Celsius. The anhydrous form of Potassium carbonate forms above 200 degrees Celsius. Potassium carbonate decomposes at 891 degrees Celsius. Pressure changes may be exploited to induce carbonate precipitation. For example, calcium carbonate begins dissolving at a pressure of approximately 37,000 kPa and completely dissolves at a pressure at or above approximately 42,000 kPa. Movement of a solution containing dissolved calcium carbonate from a high pressure state to a lower pressure state will induce precipitation. Conversely, the direct precipitation of nonhydrous magnesium carbonate may be induced at 120 degrees Celsius by raising the pressure to 10,000 kPa. Dolomite forms at 200 degrees Celsius to 250 degrees Celsius at pressures at or above about 200 kPa to 300 kPa. The pressure effect varies with carbonate type, temperature, pH, and concentrations of carbonate and $CO_2$. Magnetic fields affect the Carbonate formation location by moving reacting particles either away from an undesirable precipitation location or toward a desired precipitation location. The following equation provides the force exerted on a charged particle by a magnetic field:

$$F=qvB \sin\theta,$$

where F is the Lorentz force measured in Newtons; q is the particle's electric charge; v is the particle's velocity; B is the magnetic field intensity (measured in teslas and alternately called magnetic induction); θ is the angle between the particle velocity and the magnetic field. Magnetic field strength levels of 5 aT or higher may be used to affect particle movement and/or dendrite morphology and alignment.

Electric fields affect reactant and reaction location through electrolysis. Electrolysis changes the local pH around electrodes with anodes becoming more acidic and cathodes become more basic. Carbonate precipitation is pH dependent. The pH differential created by the electric current flowing between electrodes causes calcium carbonate, for example, to dissolve in the acidic conditions near the anode and precipitate in the alkaline conditions near the cathode. In the absence of other Manipulations, the theoretical minimum voltage necessary to electrolyze 1 mole of pure $H_2O$ is 237.1 kJ. A Solution containing one or more electrolytes, such as Na, possesses higher conductivity. Further, higher temperatures permit lower electrolytic voltage; however, varying impurities in naturally occurring Solutions and the impacts of other Manipulations necessitate analysis of local conditions for energy requirements. Changes in pH influence Carbonate formation. Increasing pH affects both saturation and precipitation of carbonates. For example, calcium bicarbonate converts to calcium carbonate, favoring precipitation, as pH rises. The calcium carbonate solubility curve declines exponentially as pH increases from 7 to 10 and becomes asymptotic to zero above pH 10. Dolomite precipitates at pH 9.7 at 25 degrees Celsius and pH 9.1 at 100 degrees Celsius, providing another non-limiting example of the interaction between Manipulations. Cycling of pH between acid and base phases increases Carbonate precipitation, including at lower temperatures. Magnesium carbonate precipitation increases with pH cycling between about pH 6 to about pH 8 at 43 degrees Celsius. Conversely, acidic solutions dissolve Carbonates.

Turbulence enhances product formation by increasing the opportunity for carbonate molecules and/or reactants to contact and bind with other carbonates and/or reactants. Embodiments that promote mixing through turbulent solution flow exploit this Manipulation.

Solution flow rate affects precipitation rate, location, and morphology. For example, calcium carbonate precipitation rates increase with solution flow rates up to about 0.5 m/s then stabilize until about 0.7 m/s at which point shearing force generated by the solution velocity begins to inhibit deposition. Flow rates at or above 2.0 m/s prevent accumulation of iron carbonate. Flow rates above the shearing point enable Carbonate particles to remain discrete and in suspension, which is useful for production and delivery of small-particle products.

For a given set of Manipulation(s), reaction time determines Carbonate(s) volumes extracted from the solution and, for small-particle products, particle size. Shorter reaction times extract less carbon from solution and, for small-particle products, produce smaller particles. The optimal reaction time will vary with the marginal extraction cost for the Carbonate(s) being produced given the desired product(s), Manipulation(s) used, and manufacturing conditions. For example, production of a large product at a distance from the solution source benefits from longer reaction times that maximize use of delivered Solution while small-particle size products produced in a space-constrained facility near the solution source benefit from shorter reaction times that maximize unit production through Solution turnover. Practical reaction times vary from less than a second to hours.

The Manipulations may produce byproducts. For example, calcium carbonate precipitation produces hydrogen (H) gas and continued heating above 550 degrees Celsius outgasses carbon dioxide. These gasses may be captured and utilized in the manufacturing process, such as (but not limited to) inputs for energy production, organism cultivation, and precipitation control.

Organisms may be used to enhance carbonate accumulation. These organisms, including (but not limited to) Coccolithophores and Foraminifera, form carbonate structures. A suspension of carbonate-forming organisms improves accumulation efficiencies because the organisms' carbonate structures may be incorporated into the precipitated material. The carbonate-forming organisms may be harvested directly from the environment or cultivated and added to a developed solution. The inclusion (or exclusion) of naturally occurring calciferous microorganisms may be accomplished by exploiting ecosystem characteristics. For example, the photic zone of the water column, persistently eutrophic locations, and locations with favorable conditions at certain times, e.g. the Great Calcite Belt in the Southern Ocean during Spring and Summer, contain greater numbers of calciferous microorganisms than other depths, locations, and seasons. These depths, locations, and seasons may be used as solution sources with in situ harvest of microorganisms or avoided depending upon the choice to include or exclude calciferous microorganisms.

These types of manipulations may be exploited in additive manufacturing apparatuses and processes or a hybrid of additive and formative manufacturing apparatuses and processes to produce products of desired sizes, shapes, and qualities. The manufacturing processes can produce products at any scale, including (but not limited to) from nanoscale to landscape scale. Further, manufacturing may occur in situ or ex situ and in a continuous or batch process.

Hybrid additive-formative manufacturing processes combine the layer by layer accretion through an additive manufacturing process with a form to constrain the solution to the desired shape during the precipitation phase. This hybrid process differs from pure additive or formative processes by utilizing a form incrementally.

Different embodiments may be employed depending upon the desired production efficiencies, product(s), and use case(s). Components in the embodiments may be combined in one to one, one to many, and many to one configurations. Three non-limiting examples illustrate some of the potential embodiments.

Figure 2:
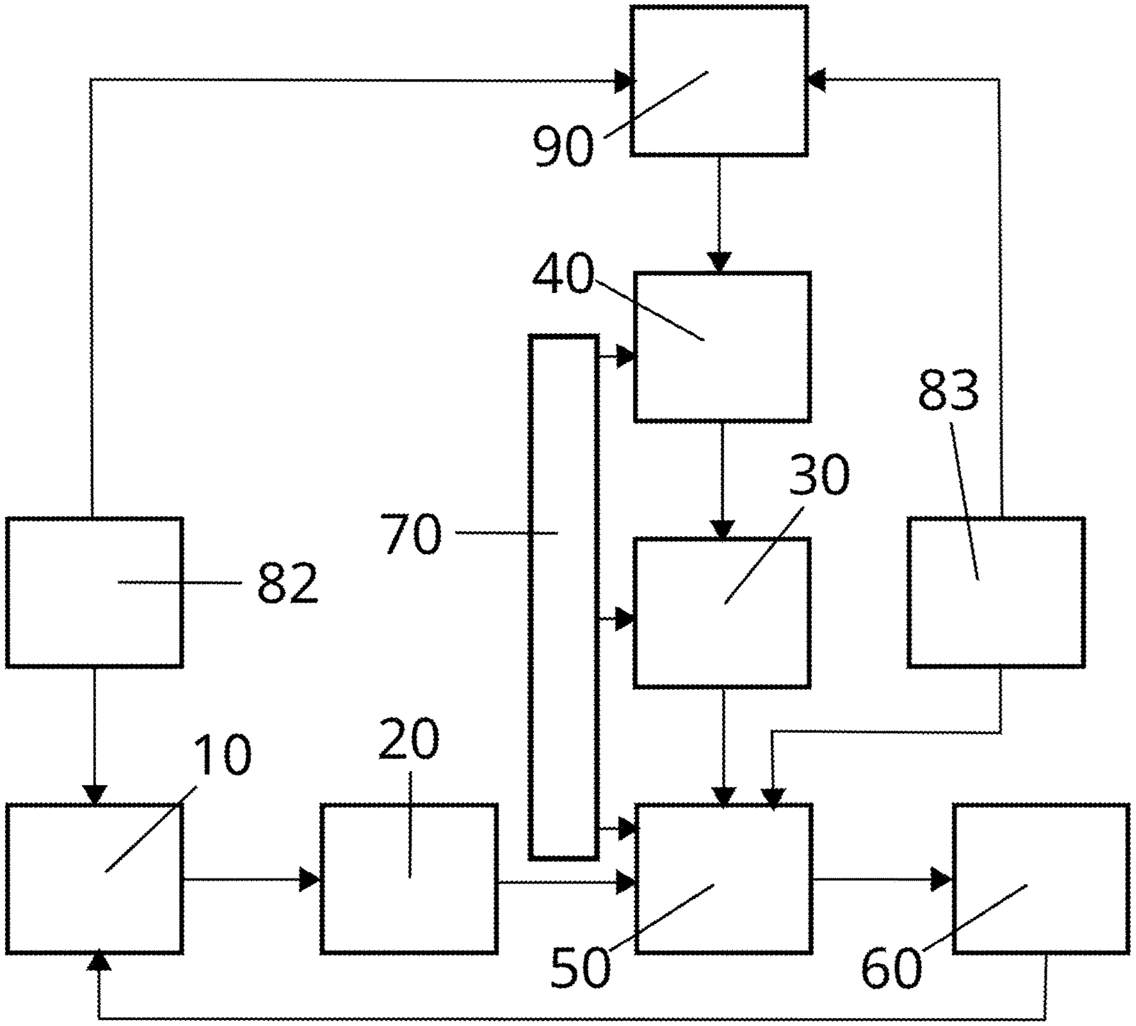
FIG. 2 shows the block diagram of a moderately complex embodiment of the apparatus for creating products containing sequestered carbon derived from naturally occurring or developed solutions.

An embodiment (Embodiment 1) consists of a Solution (10) containing Carbonates and/or reactants producing Carbonates, a means (20) to deliver the Solution to an Accumulation Area (50), a means of exposing (30) the Solution (10) to one or more source(s) of synergistic stimulation (40) that produces one or more Manipulations, and a means of removing (60) supernatant liquid. FIG. 1 illustrates this embodiment. Another embodiment (Embodiment 2) consists of a Solution (10) containing carbonates and/or reactants producing carbonates, a means (20) to deliver the Solution (10) to an Accumulation Area (50) that may include (but is not limited to) a form(s), a means of exposing (30) the Solution (10) to one or more sources of synergistic stimulation (40) that produces one or more Manipulations, a support (70) connecting the exposure means (30) and the stimulation source (40) to the Accumulation Area (50), a means of removing supernatant liquid (60) that may include pre-treating the Solution (10) prior to and/or contemporaneously with exposure to synergistic stimulation, one or more means (82 and 83) of collecting Measurement Data on the state of the Solution (10), the product, and/or the Accumulation Area (50), and one or more mechanical and/or computer controller(s) (90) that adjusts the source of synergistic stimulation (40) and/or other process aspects, such as but not limited to Solution flow rate and/or supernatant liquid removal timing. FIG. 2 illustrates this embodiment.

Figure 3:
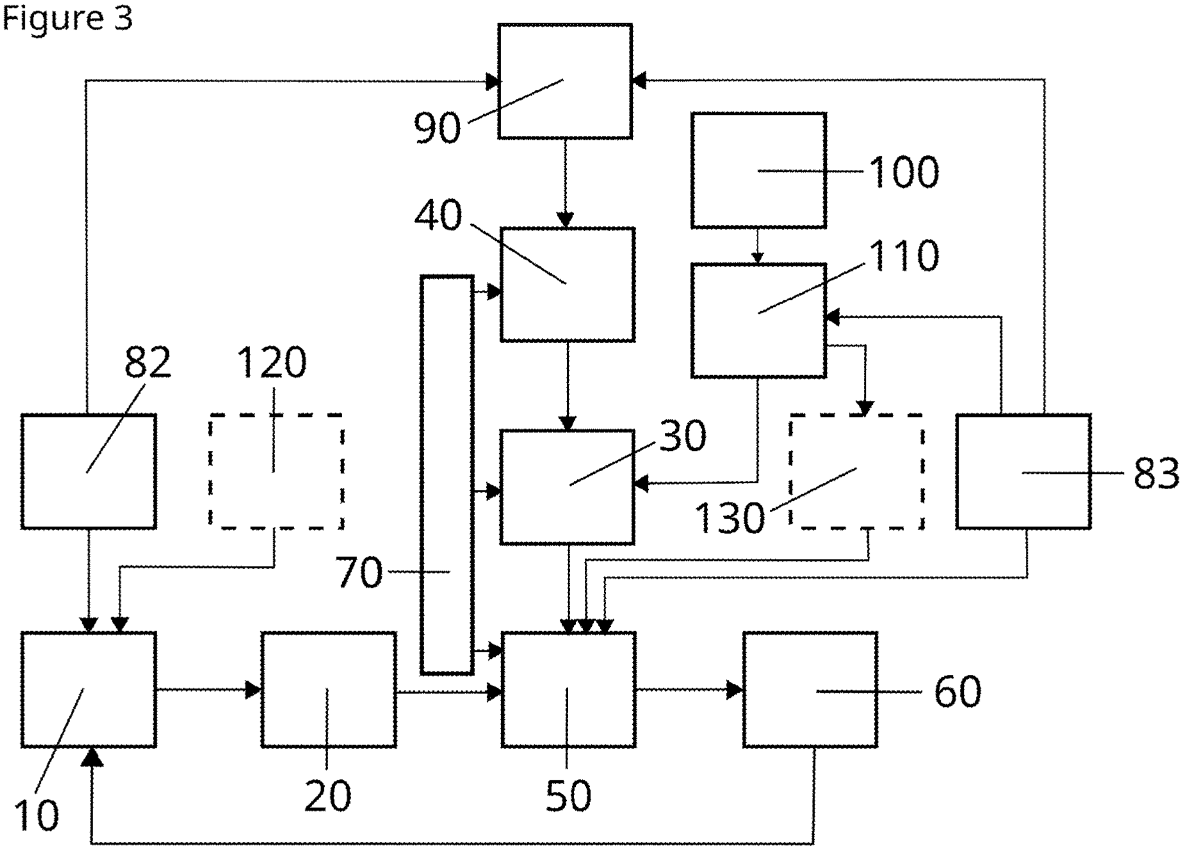
FIG. 3 shows the block diagram of a complex embodiment of the apparatus for creating products containing sequestered carbon derived from naturally occurring or developed solutions.

Another embodiment (Embodiment 3) consists of a Solution (10) containing carbonates and/or reactants producing carbonates, an optional means (120) of enhancing the Solution's yield, a means (20) to selectively deliver the Solution to an Accumulation Area (50), a means of exposing (30) the Solution (10) to one or more source(s) of synergistic stimulation (40) that produces one or more Manipulations, a support (70) positioning the exposure means (30) and the stimulation source (40) proximate to the Accumulation Area (50), a means of removing (60) supernatant liquid that may include pre-treating the Solution (10) and/or generating power prior to and/or contemporaneously with exposure to synergistic stimulation, one or more means (82 and 83) of collecting Measurement Data on the state of the Solution (10), the product, and/or the Accumulation Area (50), one or more mechanical and/or computer controller(s) (90) that adjusts the source(s) of synergistic stimulation (40) to affect the Manipulations, a means (100) for generating data representing cross-sections of the three-dimensional object to be formed, an optional magnetic field source (130), and one or more controller(s) (110) that adjusts the exposure means (30) of the synergistic stimulation and the magnetic field source (130). The optional means (120) of enhancing a Solution (10) may include, but is not limited to, the addition of reactants or carbonate-forming organisms. FIG. 3 illustrates this embodiment.

Methods utilized by embodiments vary in complexity depending upon the manufacturing location, uses, and characteristics of the product(s) being produced. Different combinations and permutations of embodiments and methods may be used depending upon the desired result. Three non-limiting examples illustrate some of the potential methods.

Figure 22:
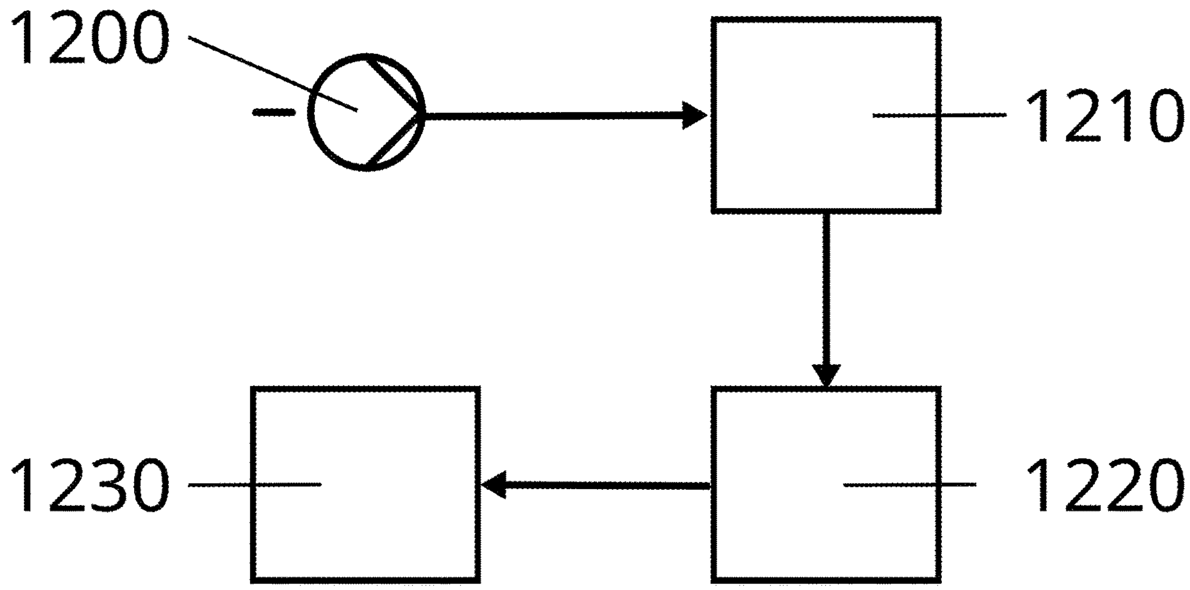
FIG. 22 shows a flow diagram of Method 1 for manufacturing products with the apparatus.

A method (Method 1), which simultaneously produces one or more three-dimensional object(s) containing Carbonates from a Solution containing Carbonates and/or reactants producing Carbonates when subjected to one or more Manipulation(s) affecting synergistic stimulation, comprises: moving (1200) a Solution containing Carbonates and/or reactants producing Carbonates to an Accumulation Area by applying energy or force external to the Solution and/or exploiting latent or kinetic energy in the Solution; synergistically stimulating (1210) the Solution by one or more Manipulations to cause the formation (1220) of one or more objects containing Carbonates; and removing (1230) the supernatant liquid. See FIG. 22. Embodiment 1 provides a non-limiting example of an embodiment using Method 1.

Figure 23:
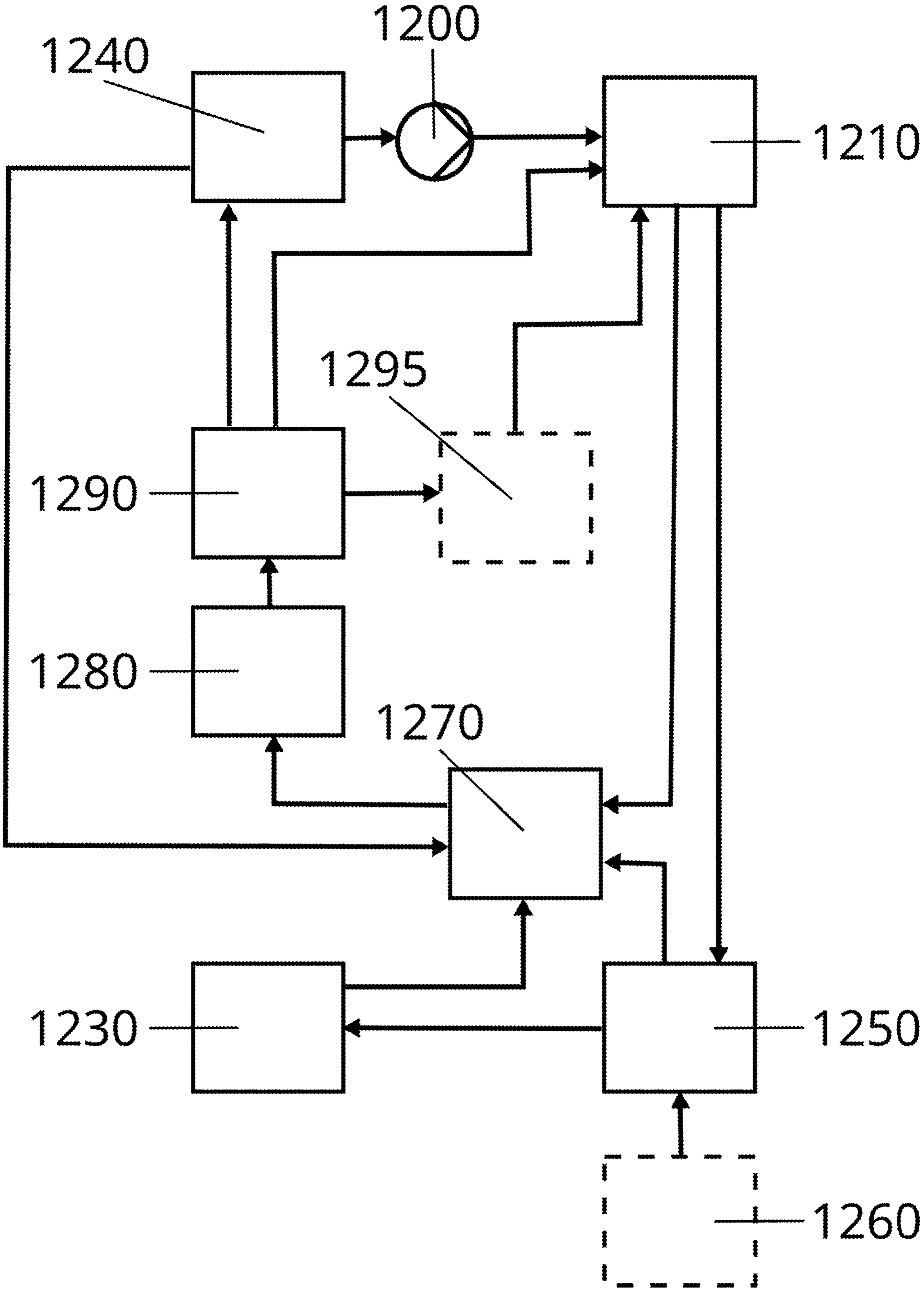
FIG. 23 shows a flow diagram of Method 2 for manufacturing products with the apparatus.

Another method (Method 2), which simultaneously produces one or more three-dimensional object(s) containing Carbonates from a Solution containing Carbonates and/or reactants producing Carbonates when subjected to one or more Manipulation(s) affecting synergistic stimulation, comprises: pretreating (1240) a Solution containing Carbonates and/or reactants producing Carbonates with one or more Manipulations that affect the Solution and/or product to, but not limited to, enhance process efficiency and/or affect product characteristics; moving (1200) the Solution, by applying energy or force external to the Solution and/or exploiting latent or kinetic energy in the Solution, to an Accumulation Area that may include one or more form(s); synergistically stimulating (1210) the Solution causing the deposition (1250) of layers of materials using one or more Manipulation(s) from one or more stimulation source(s), which may optionally include simultaneous treatment (1260) with Manipulations that affect the Solution and/or product to, but not limited to, enhance process efficiency and/or affect product characteristics; affecting selective synergistic stimulation (1210) of the Solution through one or more Manipulations causing the deposition of another layer in the form(s); adhering the additional layer to the prior layer during the exposure of the Solution to the synergistic stimulation (1210) causing formation of the next layer in the form(s) whereby a plurality of successively adhered layers of structure form the three-dimensional object(s) in the form(s); removing (1230) the supernatant liquid and adding (1200) new Solution between layer construction steps; collecting (1270) Measurement Data on the Solution, layers deposited, product, and/or Accumulation Area; and sending (1280) that Measurement Data to one or more controller(s) that uses the information to adjust (1290) the Manipulations and/or other process aspects; and optionally moving (1295) the exposure mechanism(s), synergistic stimulation mechanism(s), and/or the Accumulation Area to maintain a constant distance from the working surface. See FIG. 23. Embodiment 2 provides a non-limiting example of an embodiment using Method 2.

Figure 24:
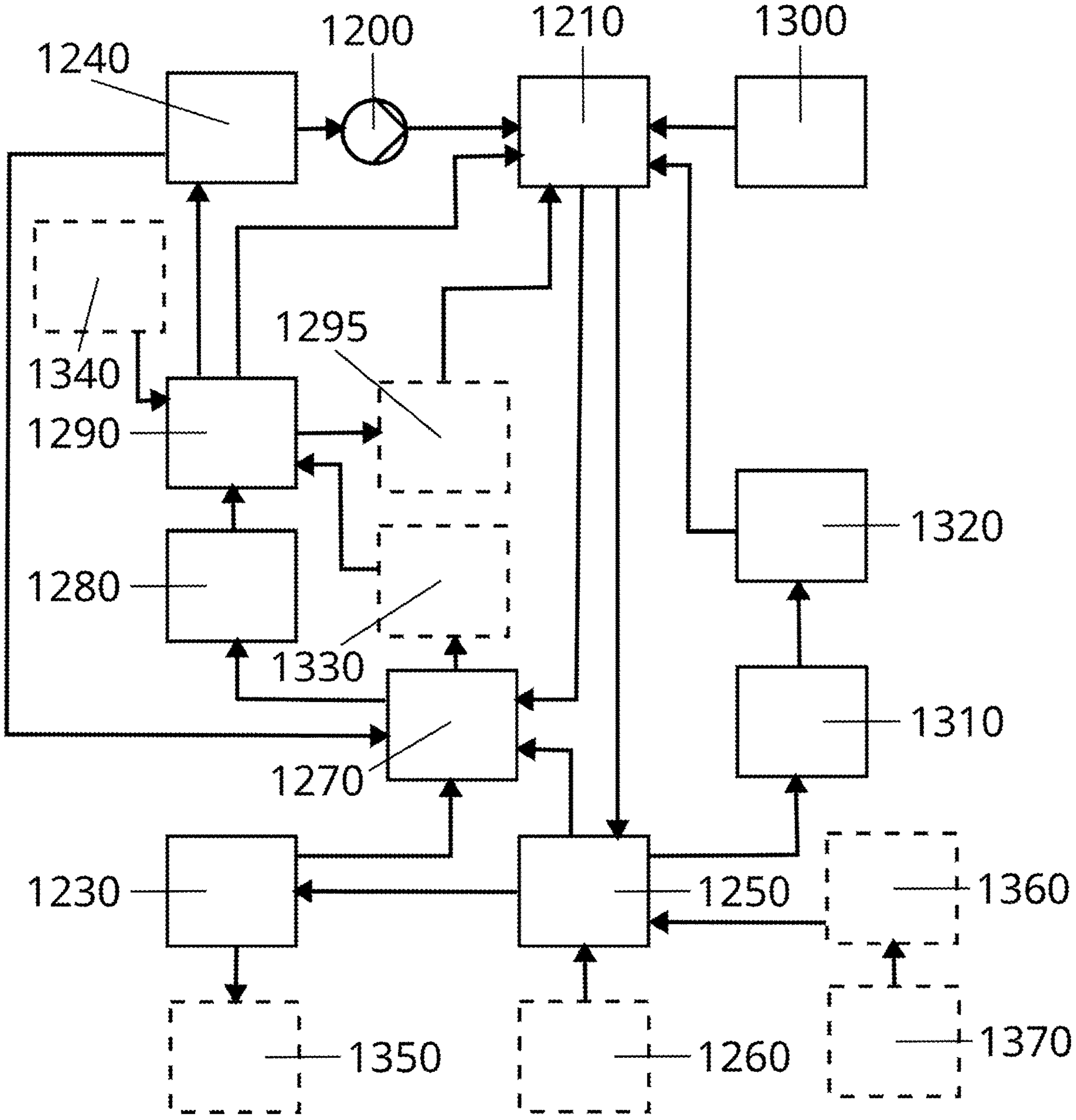
FIG. 24 shows a flow diagram of Method 3 for manufacturing products with the apparatus.

Another method (Method 3), which simultaneously produces one or more three-dimensional object(s) containing Carbonates from a Solution containing Carbonates and/or reactants producing Carbonates when subjected to one or more Manipulation(s) affecting synergistic stimulation, comprises: generating (1300) data representing cross-sections of the three-dimensional object to be formed; pretreating (1240) a Solution containing Carbonates and/or reactants producing Carbonates with one or more Manipulations that affect the Solution by, but not limited to, enhancing process efficiency and/or affecting product characteristics; moving (1200) the Solution, by applying energy or force external to the supernatant liquid and/or exploiting latent or kinetic energy in the Solution, to an Accumulation Area; forming (1250) a first cross-sectional layer of structure by exposing the Solution in the Accumulation Area to synergistic stimulation (1210) by one or more Manipulations directed by the data defining the object(s) to be formed; optionally treating (1260) the Solution and/or deposited layer during the deposition step with one or more Manipulations to affect (but not limited to) process efficiency or product characteristics; detecting (1310) the position of the Solution and/or layer surface(s); adjusting (1320) the position(s) of the Solution and/or synergistic stimulation sources to the working surface; coating (1200) the first layer of structure with a successive layer of Solution on the working surface; affecting (1210) selective synergistic stimulation of the Solution through one or more Manipulations causing the deposition (1250) of another cross-sectional layer of the product; adhering the additional cross-sectional layer to the prior cross-sectional layer during the exposure (1210) of the Solution to the synergistic stimulation causing formation (1250) of the next cross-sectional layer of structure, whereby a plurality of successively adhered layers of structure form the three-dimensional object; removing (1230) the supernatant liquid and adding (1200) new Solution between layer construction steps; collecting (1270) Measurement Data on the Solution, layers deposited, product, and/or Accumulation Area; sending (1280) that Measurement Data to one or more controllers that use the information to adjust (1290) the Manipulations and/or other process aspects; optionally using (1330) a computer for the detection and adjustment steps; optionally using a feedback process (1340) for adjusting (1290): pretreatment, Solution positioning, treatment during synergistic stimulation, and/or Manipulations; optionally generating power (1350) from the process; optionally using a magnetic field to affect (1360) layer formation; optionally using a controller to affect (1370) the magnetic field; optionally using a liquid displacement device to locate (1310) Solution position on the working surface; and optionally moving (1295) the exposure mechanism(s), synergistic stimulation mechanism(s), and/or the Accumulation Area to maintain a constant distance from the working surface. See FIG. 24. Embodiment 3 provides a non-limiting example of an embodiment using this Method 3.

Embodiments 1 through 3 and Methods 1 through 3 described above are non-limiting examples of simple, moderately complex, and complex implementations of the innovation. Additional detail of various aspects of these embodiments and methods further informs the innovation's scope.

The removal mechanism may simultaneously perform additional tasks, including (but not limited to) causing residual heat in the supernatant liquid to preheat the Solution, using residual heat in the supernatant liquid to insulate the Accumulation Area, transferring residual heat in the supernatant liquid to another process, generating electricity from the residual heat, dissipating residual heat in the supernatant liquid prior to discharge of the supernatant liquid, trapping or filtering small-particle products, and/or removing catalysts or other components of the supernatant liquid for reuse in the manufacturing process or disposal in an environmentally protective manner.

The exposure mechanism(s), synergistic stimulation mechanism(s), Accumulation Area, and removal mechanism(s) may contain features (the Buffer) to limit deposition of product material in undesired locations and/or inhibit corrosion. The Buffer may include (but is not limited to): one or more magnetic field(s), anti-scaling coatings, surface preparations to increase smoothness, and/or intermediary layers between the mechanism(s) and Solution. The intermediary layers may be composed of (but not limited to) one or more gasses, supernatant liquid, and/or insoluble liquids. See FIG. 4 described below.

Production of the product(s) may occur through either one-dimensional, two-dimensional, or three-dimensional movement of one or more of the following: the Solution, exposure mechanism(s), synergistic stimulation mechanism(s), and/or the Accumulation Area.

The Accumulation Area where the product is built may be (but is not limited to) a surface, chamber, form, natural location, or a combination of these types. Mechanism(s) for collecting Measurement Data on the Accumulation Area and product may contain one or more means of collecting Measurement Data on (but not limited to): topographical and materials properties (e.g. acoustic, atomic, chemical, electrical, magnetic, manufacturing, mechanical, optical, radiological, and thermal). The Measurement Data may be used in a variety of ways. For example, if the surface upon which the product will be constructed varies, the topological variability data may be used to affect differential accumulation of layers to reach the desired topographical layer configuration. In another example, for construction surfaces with mechanical properties such as (but not limited to) low hardness or high malleability, the surface upon which the product will be constructed may be deformed to meet product requirements prior to layer accumulation. In another example, materials properties may be assessed for their impact upon Manipulations and/or apparatus function and adjustments made to mitigate or enhance the impact(s).

Manipulations that synergistically stimulate the Solution by alteration of the Solution's temperature and/or pH may utilize directed energy ("Directed Energy"). Directed Energy may include (but is not limited to): light with wavelengths in the visible and/or invisible spectrum; electromagnetic radiation; atomic radiation; electric current; thermoelectric (Peltier) heating; resistive (Joule or Ohmic) heating; solar heating using a convex, Fresnel, or other lensing apparatus; solar heating exploiting the albedo effect; direct solar heating; convective or conductive heating from a heat source; and/or residual heat from natural or man-made sources. Directed Energy may be used with or without a magnetic field and be applied above, below, or on one or more sides of the accumulation surface.

Certain forms of Directed Energy, including (but not limited to) atomic radiation, convective or conductive heating from a heat source, and/or residual heat from natural or man-made sources, may utilize a heat transfer apparatus, such as (but not limited to) plate, gasket plate, shell and tube, and/or finned tube heat exchanger or thermoelectric circuit, in the exposure and/or synergistic stimulation mechanism(s) to transfer heat to the Solution. The removal mechanism may also utilize a heat transfer and/or thermoelectric power apparatus to pretreat the Solution and/or generate power.

Figure 4:
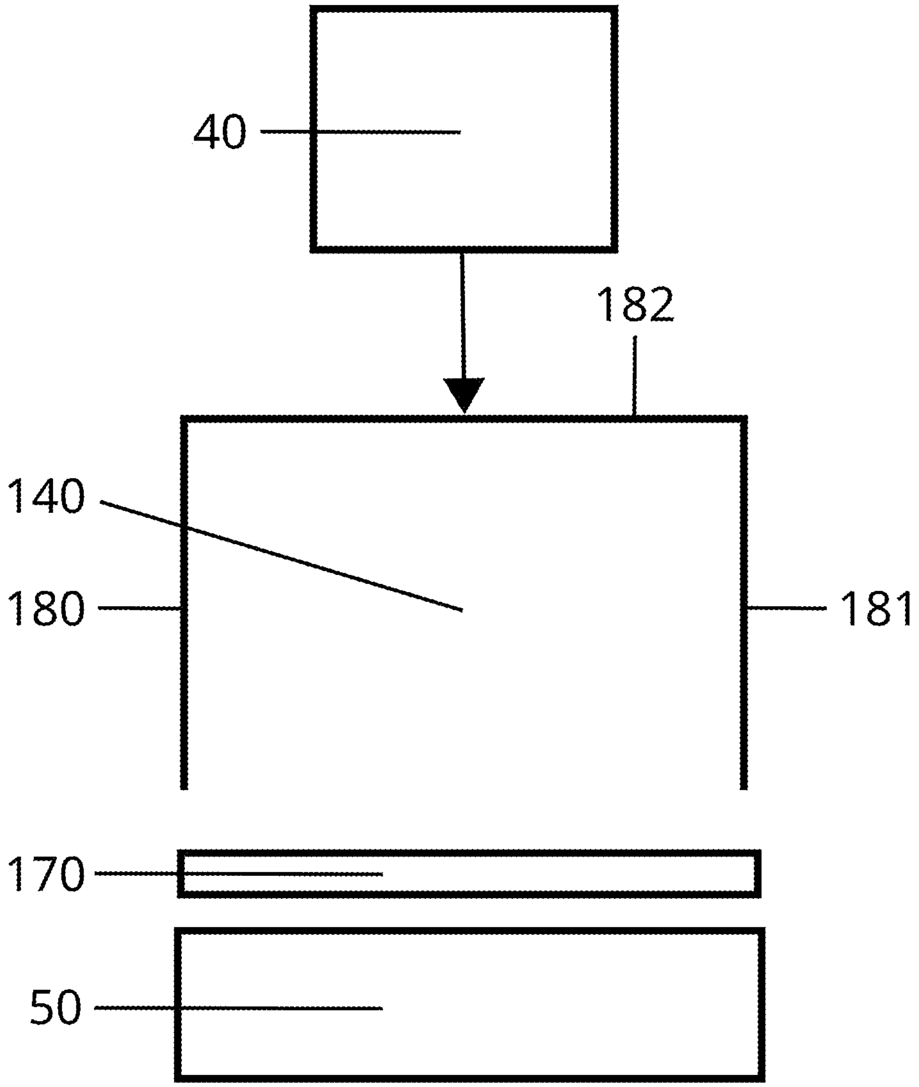
FIG. 4 is a block diagram illustrating a two-dimensional, cross-sectional view of a single Process Cell example that affects synergistic stimulation in the Solution.

FIG. 4 shows a non-limiting example of a cross-sectional view of the exposure and synergistic stimulation mechanisms in a single processing cell (the Process Cell). Walls (180, 181, and 182) bound the Process Cell on three sides and serve as the exposure mechanism. A source of synergistic stimulation (40) may be applied through one or more of the walls. The cross-sectional view of the Process Cell in FIG. 4 shows three walls (180, 181, and 182). This three-wall configuration produces a Process Cell in the shape of a channel. Another embodiment may include one or two additional walls (not shown in FIG. 4 for visual clarity but visible in FIGS. 6 through 11) in the front and back of the Process Cell, creating a three-dimensional space (140) exposed to the Solution layer (170) on one or two sides of that space. The walls may be straight, curved, and/or of another shape. For visual clarity, FIG. 4 shows the synergistic stimulation source (40) applied through one wall (182), which serves as the Exposure Mechanism; however, this is not the only possible embodiment. The walls serve multiple purposes: increasing synergistic stimulation efficiency; isolating synergistic stimulation to the Process Cell's exposure area; increasing turbulence in the Solution layer (170) flowing between the Process Cell and Accumulation Area (50); increasing structural strength of the Process Cell; and creating a dead space and/or surface area on the walls that contains the Buffer (140) limiting accumulation of product material in undesired locations. The Manipulation(s) caused by the synergistic stimulation source (40) transfer through the Buffer (140) to the Solution layer (170), causing a product material layer to form on the Accumulation Area (50). Additional product layers accrete when a new Solution is placed between the Process Cell and Accumulation Area and stimulated synergistically.

The Process Cell example illustrated in FIG. 4 is capable of operating submersed in the Solution or separated from but adjacent to the Solution. Depiction of the Solution layer (170) below the Process Cell in FIG. 4 is a non-limiting example for visual clarity. Further, other embodiments of the Process Cell may omit one or more of the walls (180, 181, 182). Embodiments with one or more walls omitted may utilize (but are not limited to) a Buffer consisting of a surface coating on wall (182), a Process Cell that is not submersed in the Solution, and/or a synergistic stimulation source(s) (40) that does not require walls to isolate the stimulation, for example (but not limited to) an optical stimulation source that uses lenses to focus the energy.

Dimensions of a Process Cell depend upon: the product size and resolution or detail required, Process Cell component size and cost constraints, and production volume desired. While Process Cells capable of producing nanometer scale products may also produce large-scale products, the total operating cost, including capital and operating expenses, may be higher than Process Cells using less expensive and less capable components. Thus, product market demand and production economics affect the desired Process Cell dimensions.

Figure 5:
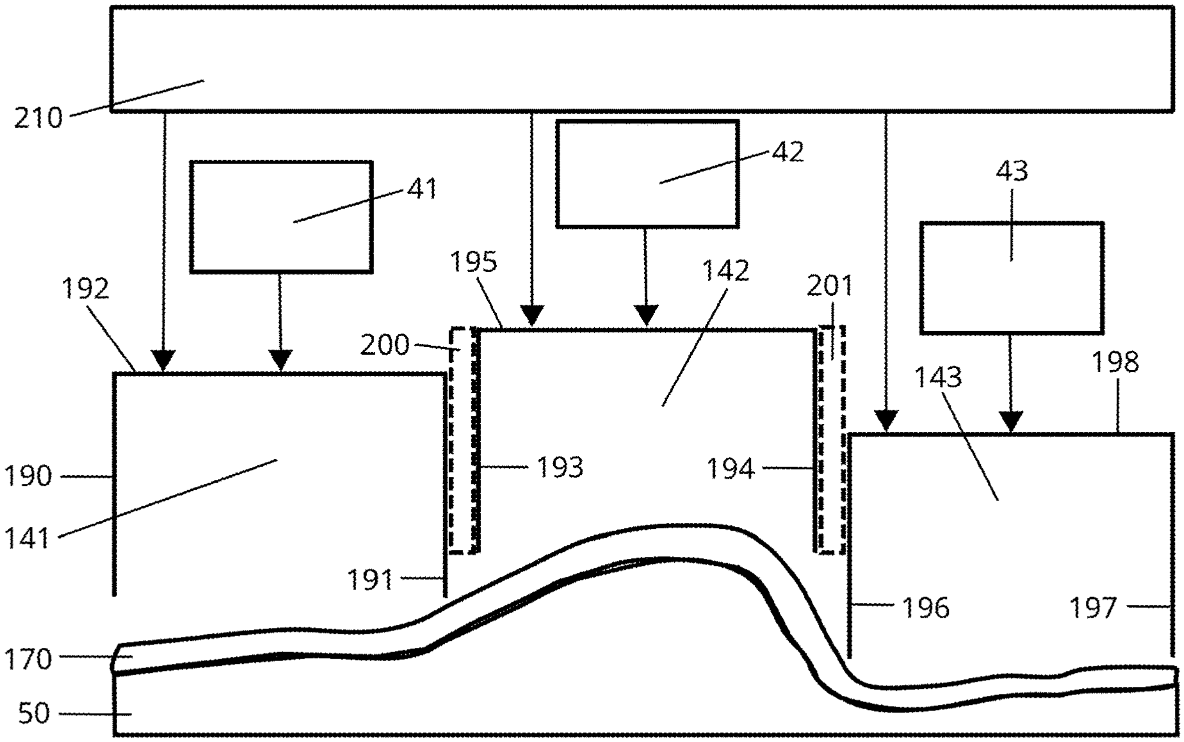
FIG. 5 is a block diagram illustrating a two-dimensional, cross-sectional view of a Process Grid example composed of three Process Cells that affect synergistic stimulation in the Solution over an uneven Accumulation Area.

Multiple Process Cells may be combined in a massively parallel arrangement (the Process Grid). The Process Grid enables simultaneous manufacturing of one or more products(s) and/or product subparts, which reduces manufacturing time. Process Cells in the Process Grid may be adjusted and/or operated en masse or individually. FIG. 5 shows the cross-sectional view of a three-Cell Process Grid with each Process Cell's height adjusted individually to accommodate an irregular Accumulation Area (50). Process Cell One includes: walls (190, 191, and 192), a synergistic stimulation source(s) (41), and a Buffer (141). Process Cell Two includes: walls (193, 194, and 195), a synergistic stimulation source(s) (42), and a Buffer (142). Process Cell Three includes: walls (196, 197, and 198), a synergistic stimulation source(s) (43), and a Buffer (143). A support structure (210) connects to each Process Cell and enables Process Cell adjustment.

The existence and purpose of the dotted-line rectangles (200 and 201) located between Process Cells vary by embodiment. In one embodiment, the Process Cell sides abut without a gap. In this type of embodiment, the rectangles (200 and 201) do not exist. In other embodiments, the rectangles (200 and 201) may include (but are not limited to)

Measurement Device(s) to measure the Process Cell(s), Process Grid, Accumulation Area, product, and/or Solution; mechanisms to adjust the height and orientation of the adjoining Process Cells; a means of adding reactants and/or other additives to the Solution layer (170); and/or a means of injecting Solution onto the Accumulation Area instead of or in addition to lateral Solution insertion into the gap between the Process Grid and Accumulation Area.

Figure 6:
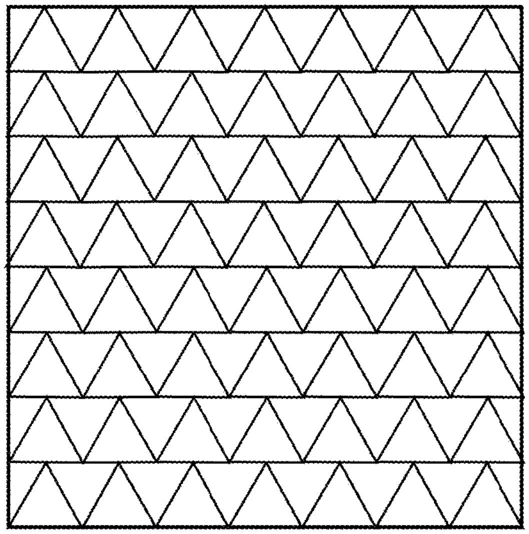
FIG. 6 shows a two-dimensional view of a Process Grid example composed of triangular-shaped Process Cells.
Figure 7:
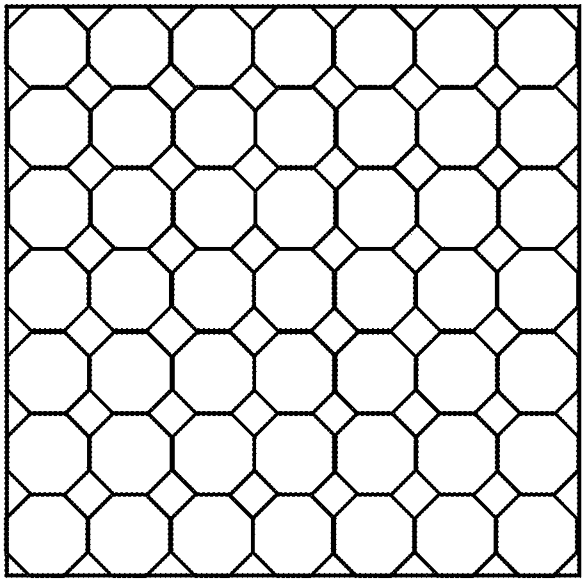
FIG. 7 shows a two-dimensional view of a Process Grid example composed of octagon-shaped Process Cells.
Figure 8:
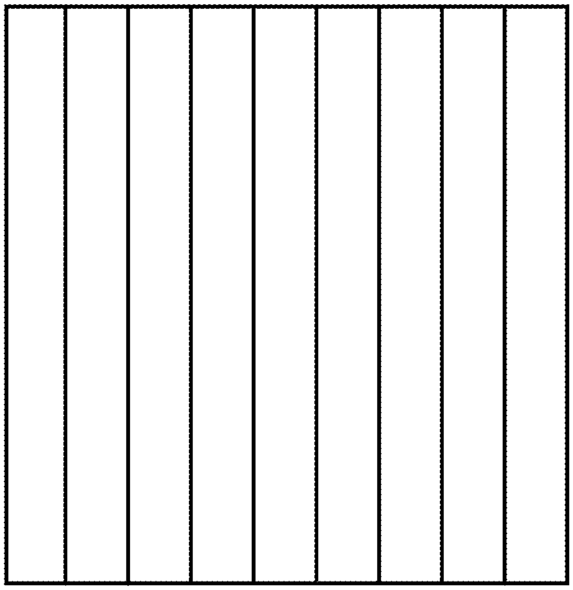
FIG. 8 shows a two-dimensional view of a Process Grid example composed of rectangular-shaped Process Cells.
Figure 9:
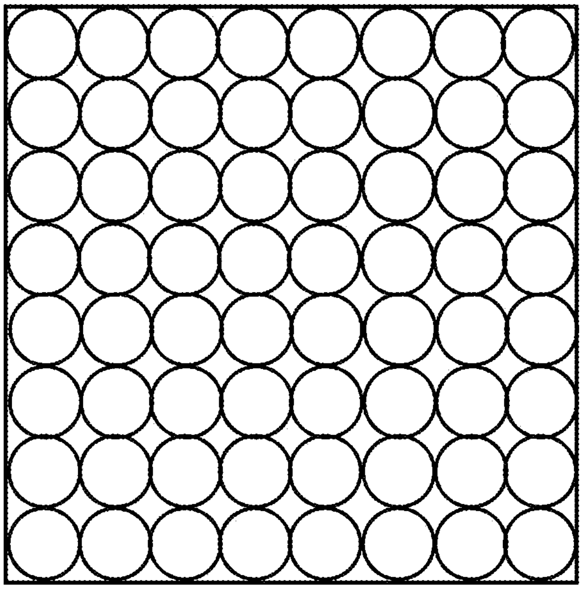
FIG. 9 shows a two-dimensional view of a Process Grid example composed of circular-shaped Process Cells.
Figure 10:
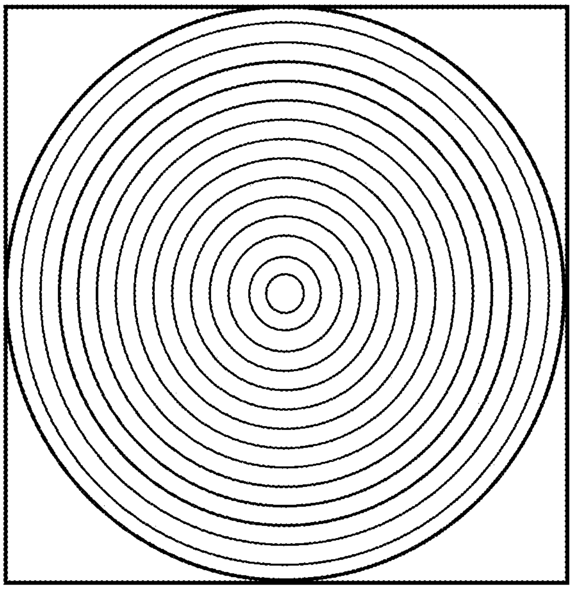
FIG. 10 shows a two-dimensional view of a Process Grid example composed of concentric circular-shaped Process Cells.
Figure 11:
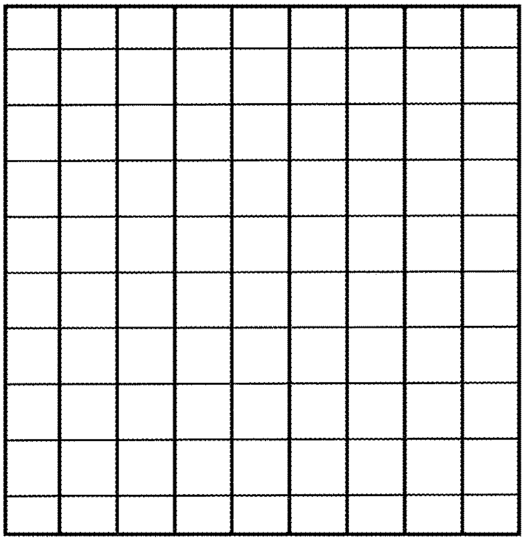
FIG. 11 shows a two-dimensional view of a Process Grid example composed of square-shaped Process Cells.

FIGS. 6 through 11 provide non-limiting examples of two-dimensional views of Process Grids with different Process Cell arrangements. FIG. 6 shows a Process Grid composed of triangular-shaped Process Cells. FIG. 7 shows a Process Grid composed of octagon-shaped Process Cells. FIG. 8 shows a Process Grid composed of rectangular-shaped Process Cells. FIG. 9 shows a Process Grid composed of circular-shaped Process Cells. FIG. 10 shows a Process Grid composed of concentric circular-shaped Process Cells. FIG. 11 shows a Process Grid example composed of square-shaped Process Cells. In these figures, the Process Cells are arranged into square Process Grids; however, other Process Grid shapes are possible. The Process Grid shape may be fixed or variable. A non-limiting example of a variably shaped Process Grid is a Process Grid with Process Cells arranged to match the cross-sectional shape of the product layers in a form used in the hybrid additive-formative manufacturing process. A variably shaped Process Grid may be used with different shaped forms by rearranging Process Cells when a different form is used. In another non-limiting example, an embodiment changes the Process Grid shape to conform to the cross-sectional layer data of the product being produced.

Accumulation Area

Accumulation Area is further described as the location where the product is built. Examples of Accumulation Areas include (but are not limited to): a liquid, surface, chamber, form, natural location, space, or a combination of these types. The Accumulation Area may comprise one or more form(s) or product build locations. Further, the Accumulation Area may comprise zero or more confining structures, such as walls.

Figure 12:
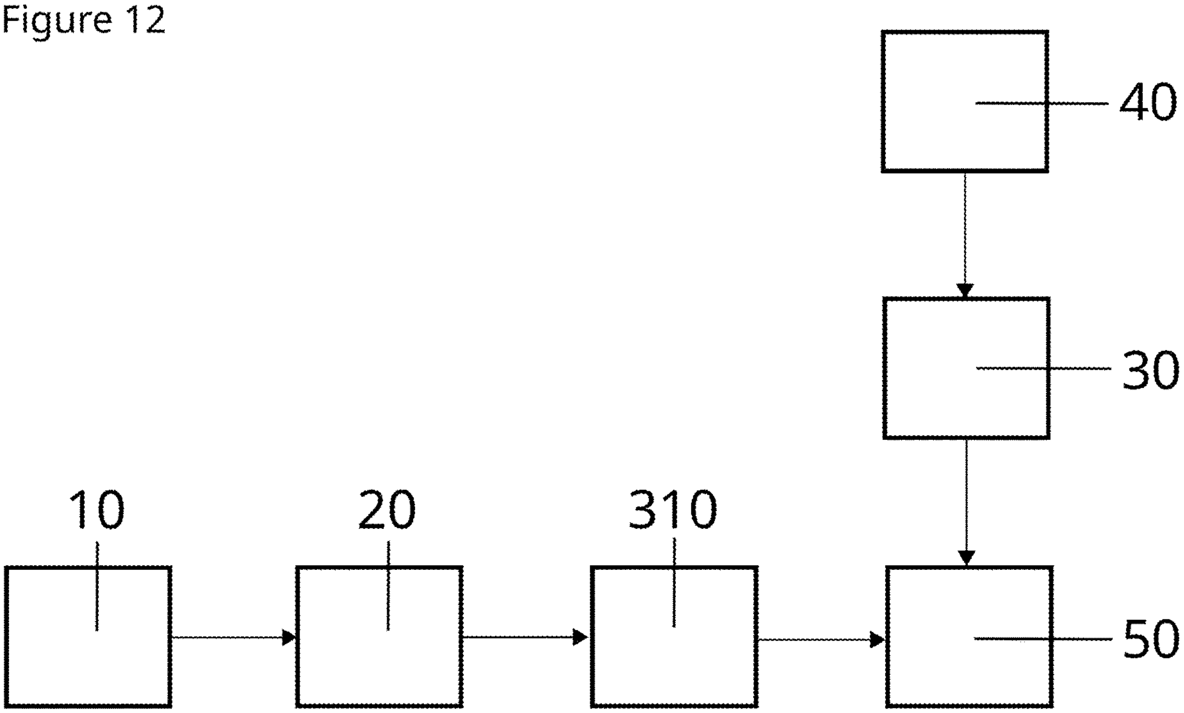
FIG. 12 shows the block diagram of an embodiment of the apparatus using an Accumulation Area with no walls for creating products containing sequestered carbon derived from naturally occurring or developed solutions.

FIG. 12 illustrates an example embodiment using an Accumulation Area (50) with no walls comprising a Delivery Mechanism (20) that delivers a Solution (10) in the form (310) of a mist, spray, or directed stream that traverses an Accumulation Area space (50) and becomes synergistically stimulated by an Exposure Mechanism (30) exposing a Stimulation Source (40) during traversal. Accumulation may be controlled by (but not limited to) stimulation intensity, traversal length, exposure time, and/or repeated traversals.

Figure 13:
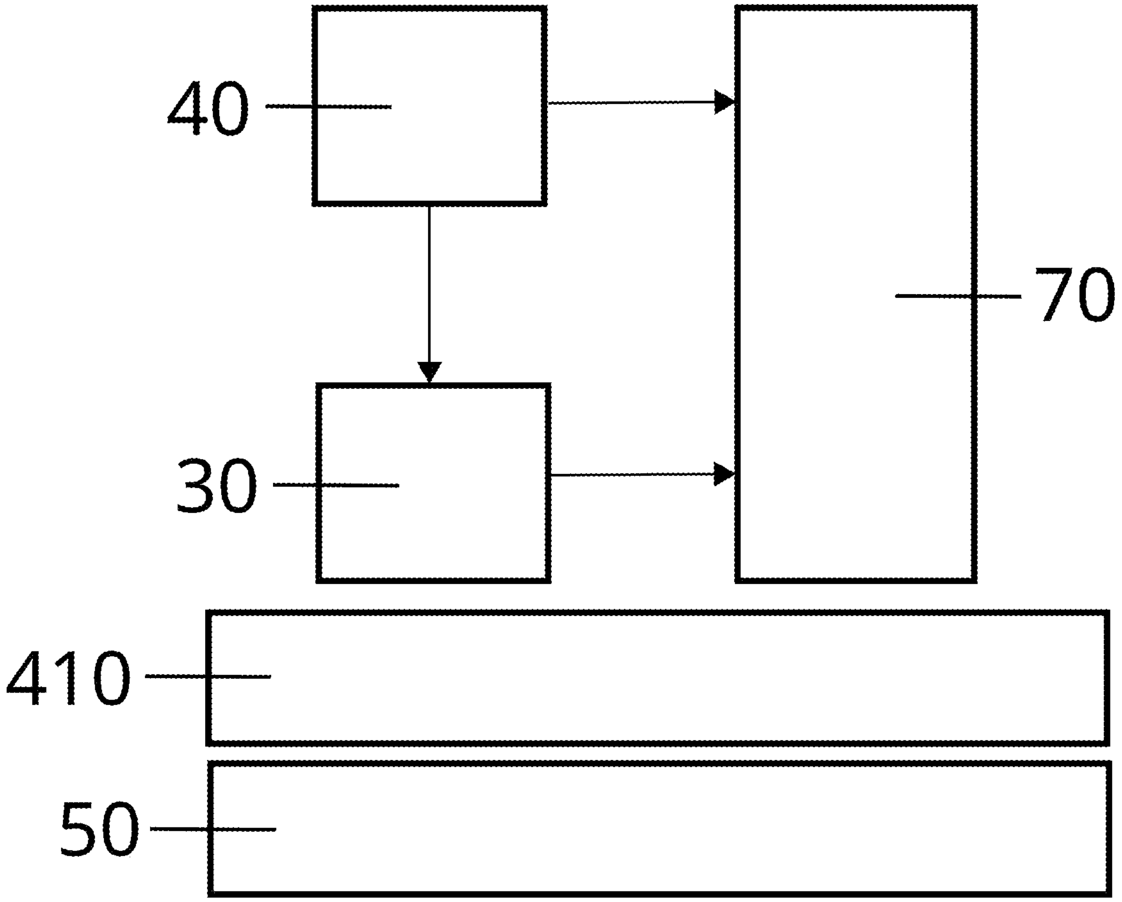
FIG. 13 shows the block diagram of an Accumulation Area example using a horizontal or vertical surface (plus only example-specific components).

Another example (FIG. 13) of an Accumulation Area comprises a laminar flow of Solution (410) across a horizontal and/or vertical surface serving as the Accumulation Area (50). The Solution (410) is exposed to one or more Stimulation Source(s) (40) by an Exposure Mechanism(s) (30) operatively associated with the Stimulation Source (40) by a Support (70). The Exposure Mechanism (30) and Stimulation Source (40) may comprise one or more Process Cells forming a Process Grid. FIG. 13 illustrates only the relevant portions of the embodiment for this Accumulation Area example. The Solution may be incrementally and/or differentially synergistically stimulated as it flows across the plate; see description of the Process Grid above.

Figure 14:
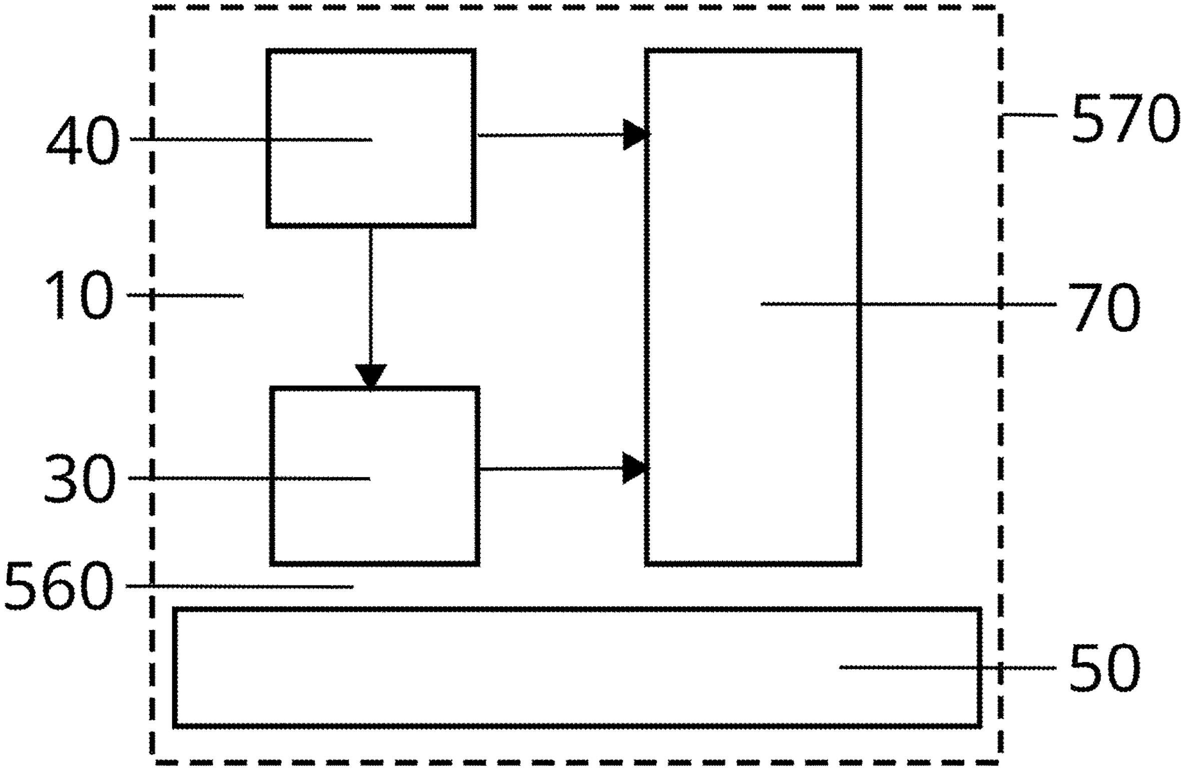
FIG. 14 shows the block diagram of an Accumulation Area example (plus only example-specific components) where the build surface and other components are submerged in the Solution.

Another example (FIG. 14) of an Accumulation Area embodiment comprises submersion of a build surface (50) in Solution (10). The Solution may be incrementally and differentially synergistically stimulated by one or more Exposure Mechanisms (30) and Stimulation Sources (40) operatively associated by a Support (70) submerged in the Solution (10) and affecting stimulation of a part (560) of the Solution (10). The Accumulation Area may optionally be contained in a container (570).

Buffer

The Buffer limits deposition of product material in undesired locations and/or inhibits corrosion. The Buffer may include (but is not limited to): one or more magnetic field(s), anti-scaling coating(s), surface preparation(s) to increase smoothness, and/or intermediary layer(s) between the mechanism(s) and Solution. The intermediary layers may be composed of (but not limited to) one or more gasses, supernatant liquid, and/or insoluble liquids. The Buffer may be created and/or maintained by (but is not limited to) the Delivery Mechanism, Exposure Mechanism, Removal Mechanism, and/or Accumulation Area.

Current-Directed Delivery Mechanism

Figure 15:
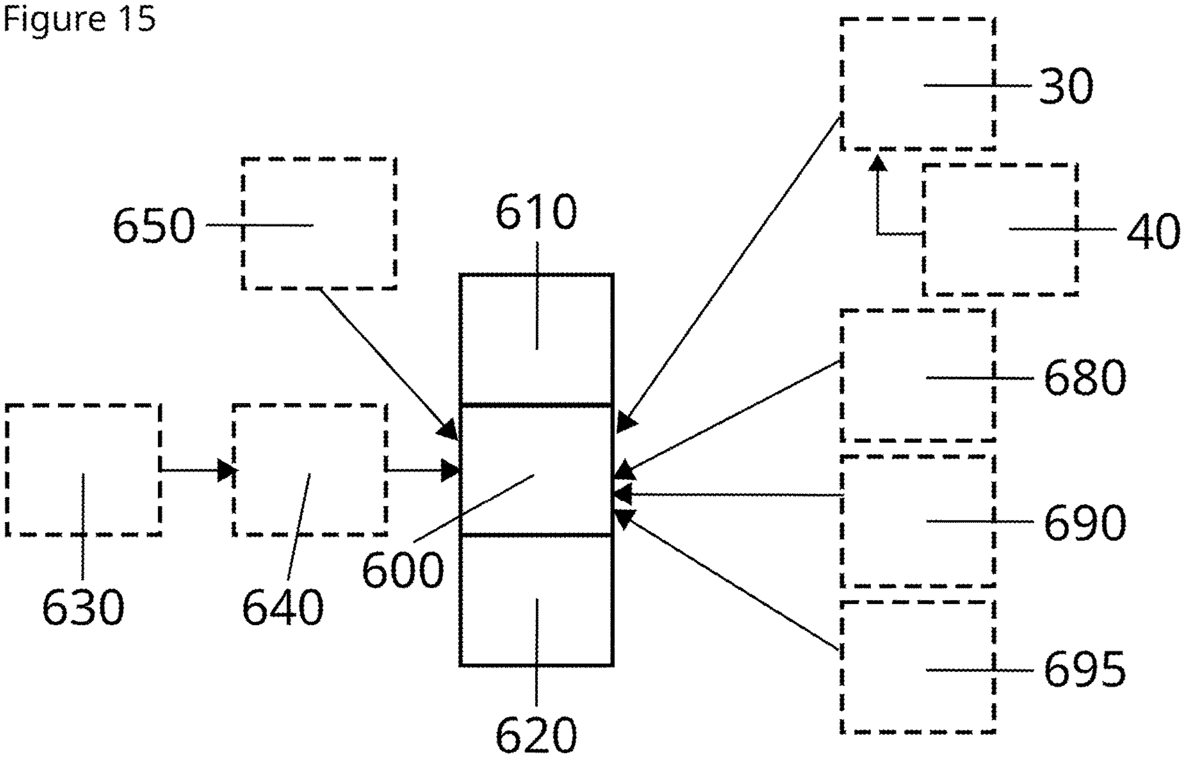
FIG. 15 shows the block diagram of a Current-directed Delivery Mechanism embodiment with optional components. The Mechanism uses the Solution's kinetic energy to position the mechanism to receive the Solution.

Current-directed Delivery Mechanism is further described as a Delivery Mechanism that delivers the Solution to the Accumulation Area using the Solution' kinetic energy to position the mechanism's intake opening to receive the Solution. The Current-directed Delivery Mechanism comprises (but is not limited to) a pivot (620), intake housing (600), and an actuator (610) and may optionally include (but is not limited to): one or more debris screens (630); screen cleaning mechanisms (640), such as (but not limited to) scrapers or back flow jets; Measurement Devices (650) to collect Measurement Data, such as (but not limited to) temperature, Solution flow direction, and/or flow rate; one or more Exposure Mechanism(s) (30) to affect Manipulations from one or more Stimulation Sources (40), such as (but not limited to) adding reagents, microorganisms, supernatant liquid, or Solution, for Solution pretreatment; one or more valves and/or other mechanisms (680) to control flow and/or pressure; a pump (690); or backflow preventer (695). See FIG. 15.

Figure 16:
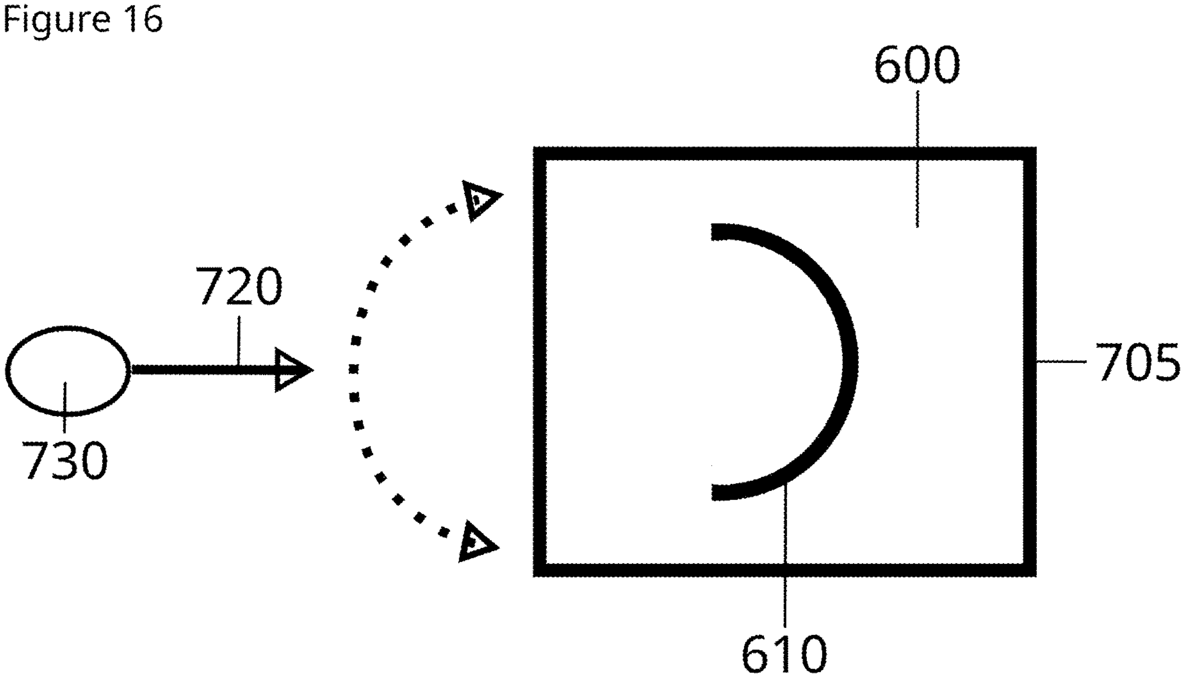
FIG. 16 shows the block diagram of a Current-directed Delivery Mechanism embodiment where a baffle uses the Solution's kinetic energy to position the mechanism to receive the Solution.
Figure 17:
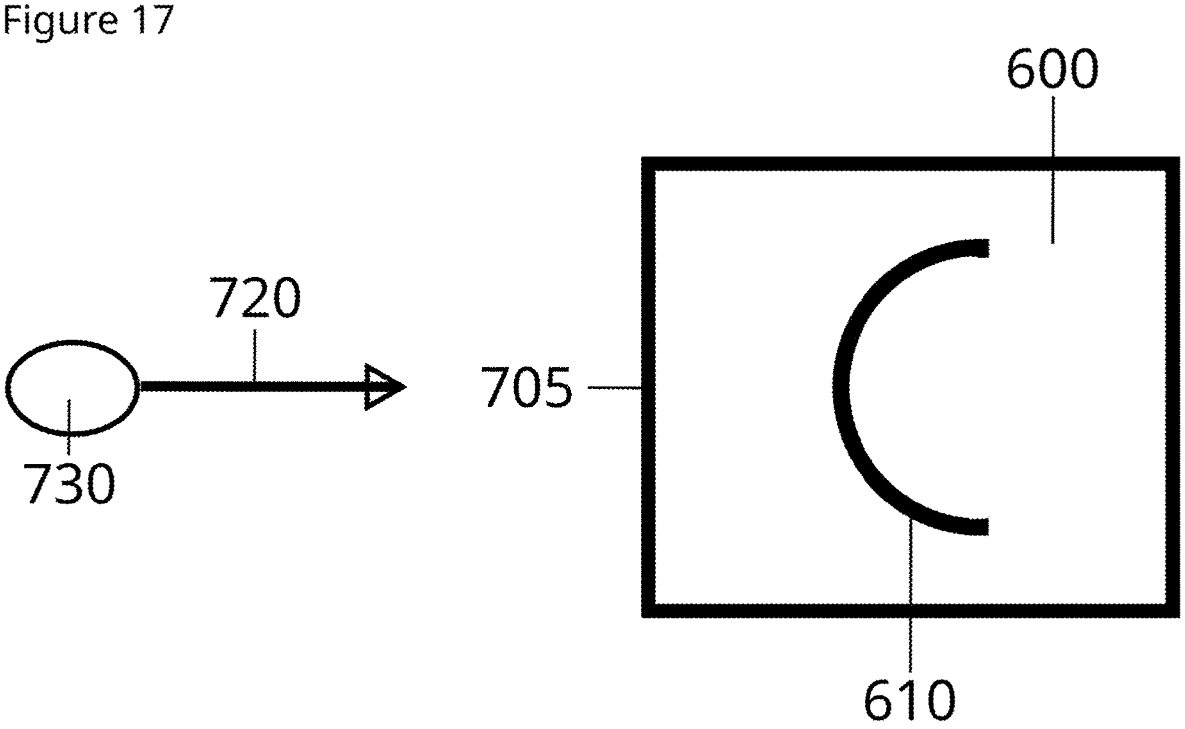
FIG. 17 shows the block diagram of a Current-directed Delivery Mechanism embodiment in which the Solution's flow has completed movement of the intake housing and current-directed surface.

In one embodiment of the Current-directed Delivery Mechanism (FIG. 16), a pivotable intake housing (600) uses a current-directed surface (610) as the actuator, such as (but not limited to) a V-shaped baffle or a concave baffle, to pivot the intake housing (600) toward the Solution flow causing the Solution's kinetic energy (720) to position the intake opening (705) to receive Solution and to move the Solution from the intake housing (600) through the intake pipe (not shown) to the Accumulation Area (not shown). For example, if the intake opening (705) is facing away from the Solution flow origin (730), the Solution's flow force (720) acting on the concave side of a baffle actuator (610) will cause the intake housing (600) to pivot the intake opening (705) toward the Solution flow origin (730) and stop pivoting once the Solution's flow force (720) acts upon the convex side of the baffle actuator (610). In this embodiment, the current-directed surface (610) and the intake housing (600) are submerged in the Solution. FIG. 16 illustrates the intake housing (600) with the intake opening (705) facing away from the Solution's flow (720) and the flow acting upon the current-directed surface (610) to turn the intake housing (600) so that the intake opening (705) receives Solution. FIG. 17 illustrates the intake housing (600), intake opening (705), and current-directed surface (610) position once movement is complete.

Delivery Mechanism

Figure 18:
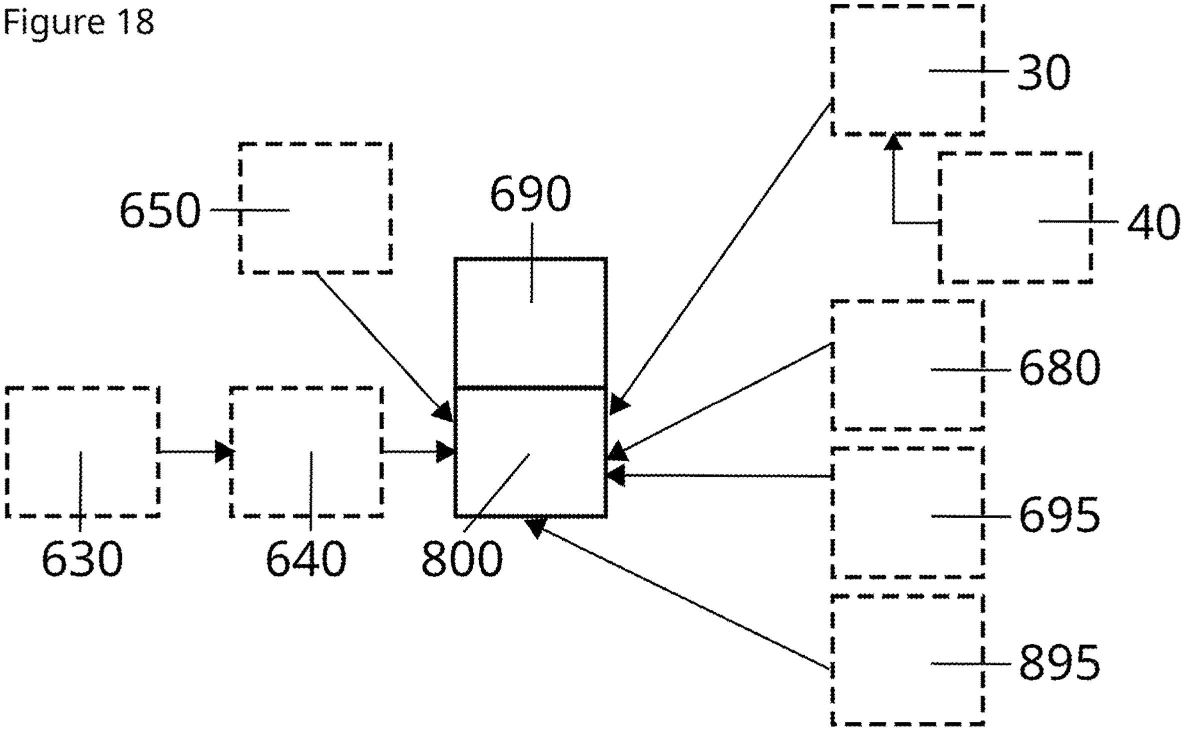
FIG. 18 shows the block diagram of a Delivery Mechanism embodiment with optional components. This embodiment uses a pump to move the Solution into and through the apparatus.

Delivery Mechanism (FIG. 18) is further described as a mechanism that delivers the Solution to the Accumulation Area. The Delivery Mechanism may optionally include (but is not limited to): one or more debris screens (630); screen cleaning mechanisms (640), such as scrapers or back flow jets; one or more Measurement Device(s) (650) to collect Measurement Data, such as (but not limited to) temperature, Solution flow direction, and flow rate; one or more Exposure Mechanism(s) (30) to affect Manipulations through one or more Stimulation Sources (40), such as (but not limited to) adding reagents, microorganisms, supernatant liquid, Solution or other Manipulations, for Solution pretreatment; one or more valves and/or other mechanisms (680) to control flow and/or pressure; backflow preventer (695); and/or heat exchanger (895) operatively associated with the Removal Mechanism (not shown) and/or another heat source.

In one embodiment of the Delivery Mechanism, a pump (690) moves Solution from a source through an intake pipe (800) into the Accumulation Area (not shown). See FIG. 18.

Exposure Mechanism

Exposure Mechanism is further described as the mechanism that enables the Stimulation Source to affect synergistic stimulation of the Solution causing Carbonate nucleation and crystal growth. The Exposure Mechanism embodiment will vary by the Stimulation Source used.

The following non-limiting examples illustrate the pairing of the Exposure Mechanism with a compatible Stimulation Source.

Some Exposure Mechanism embodiments are compatible with multiple Stimulation Sources. For example, a movable barrier is compatible with (but not limited to) the following Stimulation Sources: heaters, magnetic field generators, electric charge generators, gas or liquid turbulence inducers, Solution flow rate adjusters, processing time controls, and devices that add carbonate-producing organisms.

Figure 19:
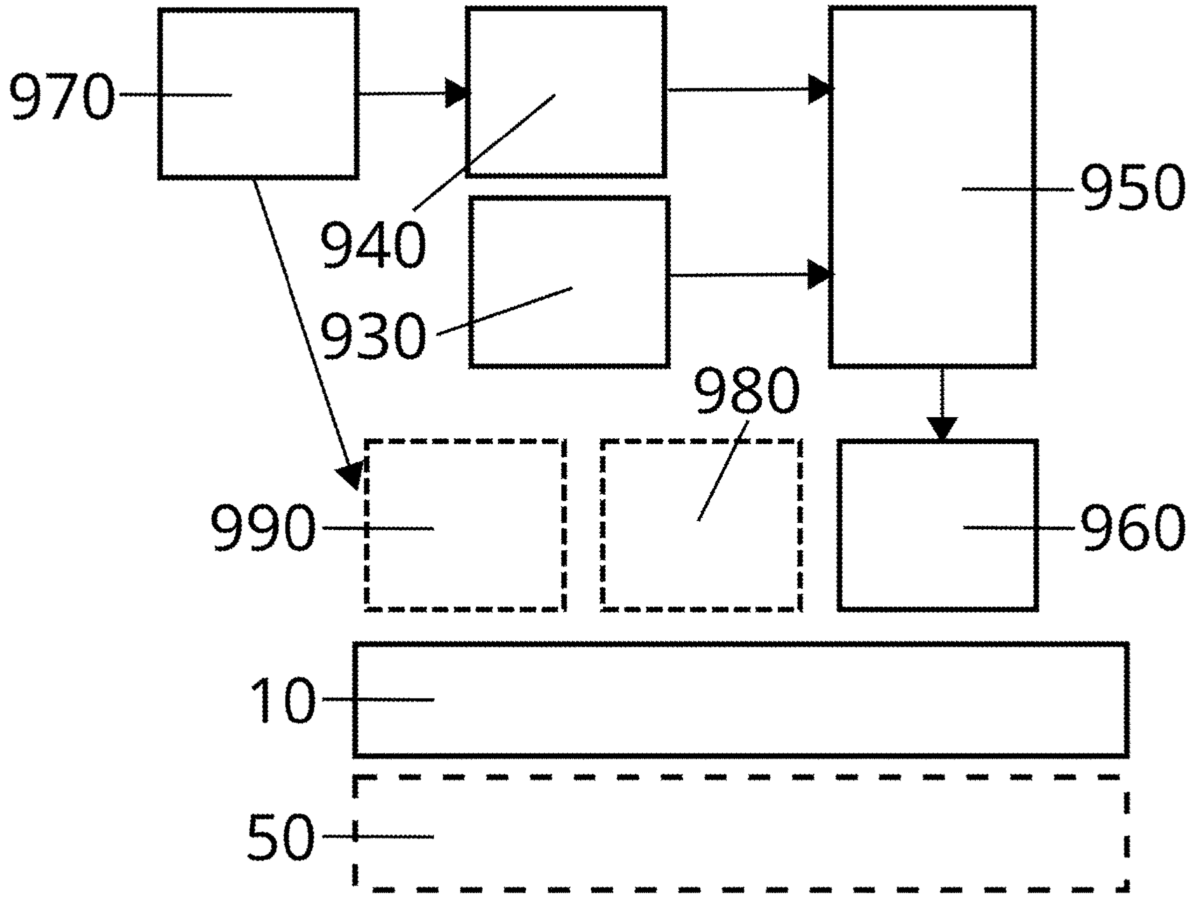
FIG. 19 shows the block diagram of an example embodiment of the Exposure Mechanism for a Stimulation Source that comprises an injection mechanism.

An example embodiment of the Exposure Mechanism for a Stimulation Source that comprises an injection mechanism includes: one or more valves (930) and pumps (940) in a one-to-one or one-to-many relationship with one or more delivery tubes (950) and/or nozzles (960) that inject one or more Injectables (970) into the Solution (10). This Exposure Mechanism embodiment may optionally include a mixing mechanism (980) that blends an intermittent or continuous flow of one or more Injectables (970) with the Solution (10); and/or a dissolving mechanism (990) that exposes one or more Injectables (970) to the Solution (10), enabling the Injectable to become a solute, through physical contact over a gaseous, liquid, and/or solid interface area. The Exposure Mechanism for the Stimulation Source using an injection mechanism may optionally selectively deliver one or more Injectables to one or more location(s) in one or more Accumulation Area(s) (50). See FIG. 19.

As described above, certain forms of Directed Energy may use a heat transfer apparatus as the Exposure Mechanism. Other forms of Directed Energy, such as light with wavelengths in the visible and/or invisible spectrum and electromagnetic radiation may use (but are not limited to) optical lenses (for light waves) or a waveguide (for electromagnetic radiation) as the Exposure Mechanism.

The Exposure Mechanism for a Stimulation Source affecting pressure may be the Stimulation Source itself, for example (but not limited to) a pressure relief valve, because the Stimulation Source changes or maintains the pressure without an intermediary mechanism. An alternative embodiment comprises a control mechanism to affect differential pressure changes through the use of one or more pressure sources. Magnetic field generator Stimulation Sources may use an Exposure Mechanism comprising a switch for temporary, electromagnet, or electromagnetic radiation sources. Alternatively, magnetic field exposure from permanent magnets and other magnetic sources may be controlled by changing the distance between the magnetic source and the target location and/or placing a barrier between the magnet and the target area. Exposure Mechanisms for an electric field generator Stimulation Sources may include (but are not limited to): electrical control circuits, electric switches, and/or a mechanism to introduce alternative anodes and/or cathodes to change the circuit, and/or change in the anode and/or cathode separation to affect the circuit.

The Exposure Mechanisms for pH adjustment Stimulation Sources may include (but are not limited to) the Exposure Mechanisms for injection mechanisms.

When turbulence is the desired Manipulation, the mechanism causing Solution movement, e.g. the Delivery Mechanism or a secondary Solution movement mechanism (for example, a pump), is the compatible Exposure Mechanism for the turbulence-inducing Stimulation Source.

The Exposure Mechanism for a Solution flow rate Stimulation Source may include (but is not limited to) the Solution Flow Rate Mechanism.

The Exposure Mechanism for a processing time Stimulation Source may include (but is not limited to) a time measurement mechanism and zero or more Measurement Device(s) that collect and transmit Solution and/or precipitate Measurement Data to a controller operatively associated with a Solution Flow Rate Mechanism.

The Exposure Mechanism for a carbonate-producing organism Stimulation Source may include (but is not limited to) the exposure mechanism for an injection Stimulation Source.

Injectables

Injectables include (but are not limited to) reagents, microorganisms, supernatant liquid, or Solution that affect the relative or absolute concentrations of Solution components.

Manipulation

A Manipulation is further described as a change in the relative or absolute concentrations of Solution components, temperature, pressure, magnetic fields, electric charge, pH, turbulence, Solution flow rate, processing time, or carbonate-producing organism levels.

Measurement Data

Measurement Data is data pertaining to any aspect of the apparatus, apparatus operation, apparatus output, and/or internal and/or external operating environment, including (but not limited to): Manipulations, component status and/or output, operating conditions, product state, and/or environmental conditions.

Measurement Device

A Measurement Device comprises any mechanism, including (but not limited to) mechanical, electronic, chemical, acoustic, optical, radiological, magnetic, atomic, or other means, that produces Measurement Data.

Pre-Treatment Mechanism

A Pre-treatment Mechanism comprises one or more Exposure Mechanism(s) and one or more Stimulation Source(s) operatively associated with one or more Delivery Mechanism(s) and/or one or more Removal Mechanism(s) for the purpose of stimulating the Solution to affect one or more Manipulation(s) prior to and/or concurrent with Solution delivery to one or more Accumulation Area(s). A Delivery Pre-treatment Mechanism is operatively associated with the Delivery Mechanism. A Removal Pre-treatment Mechanism is operatively associated with the Removal Mechanism.

Process Cell

A Process Cell is further described as comprising (but not limited to) one or more Exposure Mechanism(s) and one or more Stimulation Source(s) bound by zero or more wall(s) and zero or more Buffers.

Removal Mechanism

Figure 21:
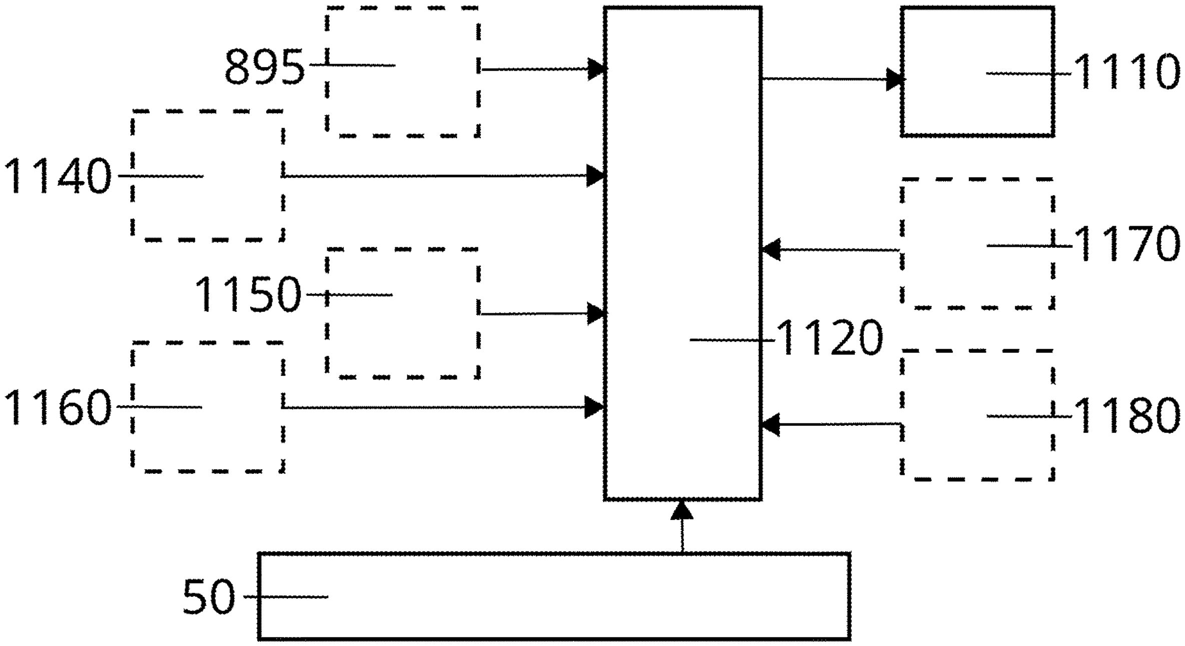
FIG. 21 shows the block diagram of an example embodiment of a Removal Mechanism that removes supernatant liquid and/or product from the Apparatus.

Removal Mechanism is further described as a mechanism, comprising (but not limited to) a discharge opening (1110) operatively connected to a discharge conduit (1120), such as (but not limited to) a tube, chamber, and/or passage, operatively associated with the Accumulation Area (50), that removes liquid(s), gasses, and/or solids. The Removal Mechanism may optionally comprise additional components, including (but not limited to): a heat exchanger (895) operatively associated with the Delivery Mechanism (not shown); a thermal buffering mechanism (1140), such as (but not limited to) tubes and/or chambers thermally buffering one or more components of the apparatus and filled with supernatant liquid; a transfer mechanism (1150) to move residual heat in the supernatant liquid to another process; one or more thermoelectric generators (1160); a heat dissipation mechanism (1170); and/or one or more selective removal mechanisms (1180), such as (but not limited to) mechanical, electrical, magnetic, and/or chemical screens, filters, and/or traps, for removing small-particle products and/or removing catalysts, gasses, or other components of the supernatant liquid. See FIG. 21.

Solution

Solution is further described as a liquid containing carbonates, bicarbonates, and/or reactants producing carbonates and/or bicarbonates and that is a naturally occurring or developed liquid. Reactants include (but are not limited to) carbon dioxide and ions capable of forming an insoluble carbonate, bicarbonate, and/or hydroxide salt comprising one or more of the following: Ca, Mg, Na, K, Ba, Sr, Fe, Zn, Pb, Cd, Mn, Ni, Co, Cu, and Al.

Stimulation Source

Stimulation Source is further described as:

1. An Injection Mechanism to add Injectables, comprising (but not limited to) a supply of one or more Injectables operatively associated with a mechanism that moves the injectables to the Exposure Mechanism; or
2. A Heating Mechanism that affects Solution temperature, including (but not limited to) a Directed Energy mechanism to produce: light with wavelengths in the visible and/or invisible spectrum; electromagnetic radiation; atomic radiation; electric current; thermoelectric (Peltier) heating; resistive (Joule or Ohmic) heating; solar heating using a convex, Fresnel, or other lensing apparatus; solar heating exploiting the albedo effect; direct solar heating; convective or conductive heating from a heat source; and/or residual heat from natural or man-made sources; or
3. A Pressure Mechanism that affects Solution pressure in one or more parts of the apparatus by changing and/or maintaining Solution pressure comprising (but not limited to) one or more: pressure source(s), change(s) in area volume through which the Solution passes, pressure fitting(s), pressure relief valve(s), pressure-reducing valve(s), pump(s), and/or operation at depths that affect pressure; or
4. A Magnetic Field Generating Mechanism comprising (but not limited to) one or more: permanent magnet, temporary magnet, electromagnet, and/or electromagnetic radiation emitter that produces a static or oscillating magnetic field continuously or intermittently; or
5. An Electric Field Generating Mechanism comprising (but not limited to) a power supply sending an electric current to an anode and a cathode between which an electric current flows; or
6. A pH Adjusting Mechanism, such as (but not limited to) a supply of alkaline and/or acidic compounds operatively associated with a dispersal mechanism, that changes Solution pH in the entire apparatus or in a part of the apparatus by affecting the concentration of pH-affecting substances in the Solution; or
7. A Turbulence Mechanism, comprising (but not limited to) one or more baffles, liquid and/or gas injectors, variation in structural dimensions that constrain the Solution, and/or other flow altering feature, that causes fluid motion characterized by chaotic changes in pressure and flow velocity; or
8. A Solution Flow Rate Mechanism, such as (but not limited to) one or more valves, flow restrictors, and/or pumps, that changes the rate and/or volume of Solution flow; or
9. A Processing Time Mechanism, comprising (but not limited to) an instrument for measuring time operatively associated with a Solution Flow Rate Mechanism that either affects flow rate and/or starts and stops Solution flow based on reaction time for reagents in the Solution; or
10. A Microorganism Mechanism affecting carbonate-producing organism levels, comprising (but not limited to) a carbonate-producing organism cultivator and/or harvest mechanism for naturally occurring carbonate-producing organisms.

Support

Figure 20:
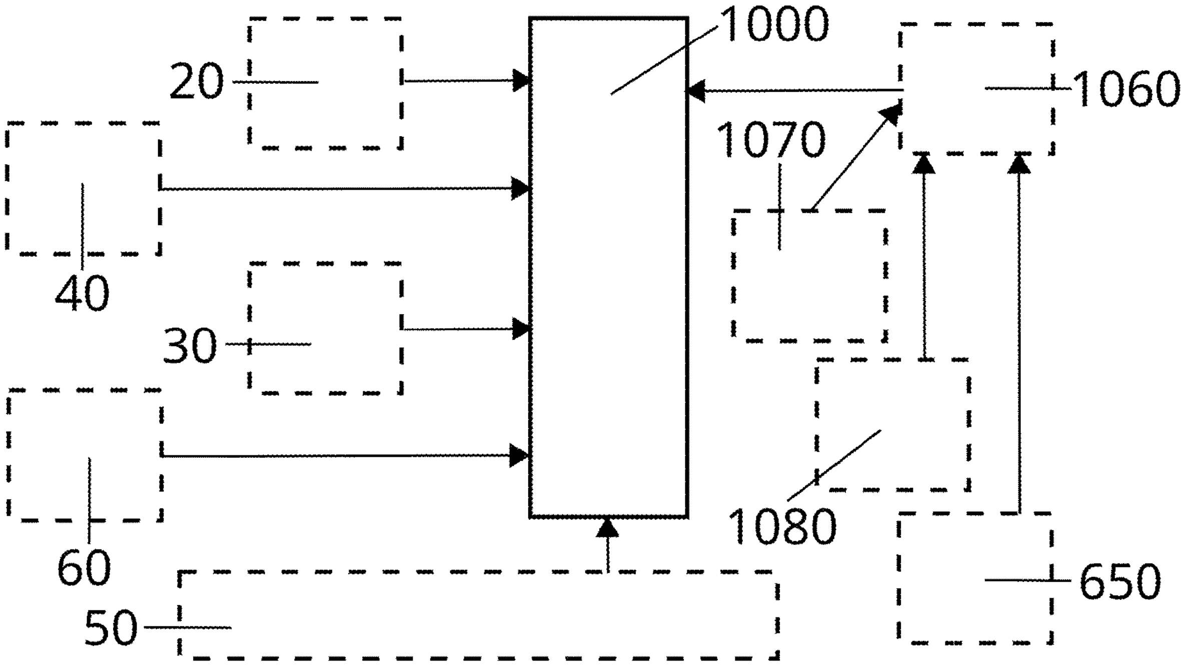
FIG. 20 shows the block diagram of an example embodiment of a Support operatively associated with two or more of: a Delivery Mechanism, Accumulation Area, Exposure Mechanism, Stimulation Source, Removal Mechanism, and/or optional adjustment mechanisms that maintain and/or adjust the relative and/or absolute position between two or more mechanisms and/or components.

A Support is further described as a mechanism comprising (but not limited to) a support structure (1000) operatively associated with two or more of: a Delivery Mechanism (20), Accumulation Area (50), Exposure Mechanism (30), Stimulation Source (40), Removal Mechanism (60), and/or optional adjustment mechanisms (1060) to maintain and/or adjust the relative and/or absolute position between two or more mechanisms and/or components. Embodiments of the Support may optionally comprise one or more of an adjustment mechanism(s) (1060), including (but not limited to) a controller (1070), actuator (1080), and/or zero or more Measurement Devices (650), that adjusts relative and/or absolute positions between two or more mechanisms and/or components. See FIG. 20.

INDUSTRIAL APPLICABILITY

A non-limiting example of industrial applicability for the Apparatus using seawater as the Solution is as follows. Magnesium carbonate (MgCO.sub.3) may be extracted from the Solution and formed into refractory bricks. Calcium carbonate (CaCO.sub.3) may be extracted from the Solution, doped with impurities (such as graphite or iron oxides), and formed into marble tiles or slabs for building applications. The Apparatus can also produce small-particle calcium carbonate for many uses, including as a soil amendment to raise pH, as an input for concrete manufacturing, and beach replenishment.

REFERENCE SIGNS LIST

10: Solution
20: Delivery Mechanism
30: Exposure Mechanism
40: Synergistic Stimulation Source
41: Synergistic Stimulation Source(s) of First Process Cell
42: Synergistic Stimulation Source(s) of Second Process Cell
43: Synergistic Stimulation Source(s) of Third Process Cell
50: Accumulation Area
60: Removal Mechanism
70: Support
82: Solution Measurement Device
83: Apparatus and Product Measurement Device
90: Stimulation Source Controller
100: Cross-sectional Data Generation Mechanism
110: Exposure Controller
120: Yield Enhancement Mechanism
130: Magnetic Field Source
140: Three-dimensional Space (Buffer) Inside a Process Cell
141: Three-dimensional Space (Buffer) Inside the First Process Cell
142: Three-dimensional Space (Buffer) Inside the Second Process Cell
143: Three-dimensional Space (Buffer) Inside the Third Process Cell
170: Layer of Solution
180: First Process Cell Wall
181: Second Process Cell Wall
182: Third Process Cell Wall
190: First Wall of First Process Cell
191: Second Wall of First Process Cell
192: Third Wall of First Process Cell
193: First Wall of Second Process Cell
194: Second Wall of Second Process Cell
195: Third Wall of Second Process Cell
196: First Wall of Third Process Cell
197: Second Wall of Third Process Cell
198: Third Wall of Third Process Cell
200: Optional Mechanism Between the First and Second Process Cells
201: Optional Mechanism Between the Second and Third Process Cells
210: Process Grid Support Structure
310: Solution in Mist, Spray, or Directed Stream Form [check spacing]
410: Laminar Flow of Solution
560: Localized Stimulation of Solution
570: Optional Solution Container
600: Intake Housing
610: Delivery Mechanism Actuator
620: Pivot
630: Debris Screen
640: Debris Screen Cleaning Mechanism
650: Delivery Mechanism Measurement Devices
680: Flow and/or Pressure Control Mechanisms
690: Pump
695: Backflow Preventer
705: Intake Opening
720: Solution's Kinetic Energy/Flow Force
730: Solution Flow Origin
800: Intake Pipe
895: Heat Exchanger
930: Exposure Mechanism Valve(s)
940: Exposure Mechanism Pump(s)
950: Delivery Tube(s)
960: Nozzle(s)
970: Injectable(s)
980: Mixing Mechanism
990: Dissolving Mechanism
1000: Support Structure
1060: Support Adjustment Mechanism(s)
1070: Support controller(s)
1080: Support Actuator(s)
1110: Discharge Opening
1120: Discharge conduit
1140: Thermal Buffering Mechanism
1150: Transfer Mechanism
1160: Thermoelectric Generator(s)
1170: Heat Dissipation Mechanism
1180: Selective Removal Mechanism(s)
1200: Solution Movement to an Accumulation Area
1210: Synergistic Stimulation of a Solution
1220: Formation of Objects Containing Carbonates
1230: Removal of Supernatant Liquid
1240: Solution Pretreatment
1250: Layer Deposition
1260: Treatment with Manipulations Simultaneous with Material Deposition
1270: Collection of Measurement Data
1280: Transmission of Measurement Data
1290: Controller Adjustment of Manipulations and/or Other Process Aspects
1295: Moving the Exposure Mechanism(s), Synergistic Stimulation Mechanism(s), and/or the Accumulation Area
1300: Generating Cross-sectional Data of a Three-dimensional Object
1310: Detecting Position of the Solution and/or Layer Surface(s)
1320: Adjusting Position(s) of the Solution and/or Synergistic Stimulation Sources to the Working Surface
1330: Computerized Detection and Adjustment of Manufacturing Processes
1340: Feedback Process for Adjusting Pretreatment, Solution Positioning, Synergistic Stimulation, and/or Manipulations
1350: Generating Power
1360: Affecting layer formation with a Magnetic Field
1370: Controlling the Magnetic Field with a Controller

CITATIONS LIST

Patent Literature

U.S. Pat. No. 5,236,637 A (HULL, C W) 17 Aug. 1993, claims 1 through 23.

U.S. Pat. No. 11,141,910 B2 (DESIMONE, J M et al.) 12 Oct. 2021, claim 1.

US 20220040639 A1 (SANT, G et al.) 10 Feb. 2022, claims 1, 17, 18, 20, 24, 26, 28, and 29.

U.S. Pat. No. 11,193,100 B2 (SIM, S J et al.) 7 Dec. 2021, claims 1 through 13.

U.S. Pat. No. 8,882,552 B2 (LAMBERT, K K) 11 Nov. 2014, claims 1 through 19.

U.S. Pat. No. 8,440,439 B2 (JOVINE, R) 14 May 2013, claims 1 through 23.

Non-Patent Literature

FEILDEN, E et al. Robocasting of Structural Ceramic Parts with Hydrogel Inks. Journal of the European Ceramic Society. 2016, Vol. 36, Issue 10, pages 2525-2533, ISSN 0955-2219.

The invention claimed is:

1. An apparatus for simultaneously building one or more object(s), comprising:

a. a Solution;

b. one or more of an Accumulation Area(s);

c. one or more of a Delivery Mechanism(s) operatively associated with one or more of the Accumulation Area(s) and one or more of a Removal Mechanism(s) and configured to deliver the Solution to one or more of the Accumulation Area(s);

d. one or more of the Removal Mechanism(s) operatively associated with one or more of the Accumulation Area(s) and one or more of the Delivery Mechanism(s) and configured to remove one or more portions of one or more of a liquid(s), one or more of a gas (ses), and/or one or more of a solid(s) from the apparatus;

e. one or more of the Delivery Mechanism(s) that comprises one or more of a Current-directed Delivery Mechanism(s) configured to use a Solution's kinetic energy to position one or more of the Delivery Mechanism(s) intake opening(s) to receive the Solution;

and one or more of a Stimulation and Exposure Mechanism(s) comprising one or more of the following:

f. one or more of a Solution Flow Rate Mechanism(s) configured to affect building of one or more object(s) from the Solution by changing the a rate and/or a volume of one or more of a Solution flow(s) in one or more of the Accumulation Area(s) and operatively associated with one or more of a Solution Flow Rate Exposure Mechanism(s) that are operatively associated with one or more of the Delivery Mechanism(s) and/or one or more of the Accumulation Area(s), and one or more of the Solution Flow Rate Exposure Mechanism(s) are configured to change one or more of the Solution Flow Rate Mechanism(s) operation(s) to alter one or more of the Solution flow(s) rate(s) and/or volume(s) to produce a change in one or more of the Solution Flow Rate Mechanism(s) effect(s) in the range between and including no effect to full effect;

g. one or more of a Process Timing Mechanism(s) configured to affect building of one or more object(s) from the Solution by affecting reaction time for reagents in the Solution in one or more of the Accumulation Area(s) through changes in one or more of the Solution flow(s) rate and/or starting and/or stopping one or more of the Solution flow(s) and operatively associated with one or more of a Process Timing Exposure Mechanism(s) that are operatively associated with one or more of the Solution Flow Rate Exposure Mechanism(s), and one or more of the Process Timing Exposure Mechanism(s) are configured to signal one or more of the Solution Flow Rate Exposure Mechanism(s) to change one or more of the Solution Flow Rate Mechanism(s) to alter one or more of the Solution flow(s) rate and/or starting and/or stopping one or more of the Solution flow(s) to produce a change in one or more of the Process Timing Mechanism(s) effect(s) in the range between and including no effect to full effect;

h. one or more of a Pressure Mechanism(s) configured to affect building of one or more object(s) from the Solution by affecting Solution pressure in one or more parts of the apparatus and operatively associated with one or more of a Pressure Exposure Mechanism(s) that are operatively associated with one or more parts of the apparatus adjacent to the Solution, and one or more of the Pressure Exposure Mechanism(s) are configured to change one or more of the Solution pressure(s) by changing the one or more of the Pressure Mechanism(s) operation to produce a change in one or more of the Pressure Mechanism(s) effect(s) in the range between and including no effect to full effect;

i. one or more of an Injection Mechanism(s) configured to affect building of one or more object(s) from the Solution by injecting into the Solution one or more of an Injectable(s) comprising reagents, microorganisms, supernatant liquid, and/or the Solution that affect one or more of a relative or an absolute concentration(s) of one or more of a Solution Component(s) in one or more of the Accumulation Area(s) and with one or more of the Injection Mechanism(s) operatively associated with one or more of an Injection Exposure Mechanism(s) that are operatively associated with one or more of the Accumulation Area(s), and one or more of the Injection Exposure Mechanism(s) is configured to cause one or more of the Injection Mechanism(s) to selectively deliver one or more of the Injectable(s) to the Solution to produce a change in one or more of the Injection Mechanism(s) effect(s) in the range between and including no effect to full effect;

j. one or more of a Heating Mechanism(s) configured to affect building of one or more object(s) from the Solution by affecting a Solution temperature in one or more of the Accumulation Area(s) and operatively associated with one or more of a Heating Exposure Mechanism(s) that are operatively associated with one or more of the Accumulation Area(s), and one or more of the Heating Exposure Mechanism(s) is configured to change the temperature of one or more portion(s) of the Solution by changing the operation of one or more of the Heating Mechanism(s) to produce a change in one or more of the Heating Mechanism(s) effect(s) in the range between and including no effect to full effect;

k. one or more of a Magnetic Field Generating Mechanism(s) configured to affect building of one or more object(s) from the Solution by affecting with a magnetic field, in one or more of the Accumulation Area(s), one or more of a spatial distribution(s) of the Solution Component(s) in the Solution, the Solution temperature, and/or the Solution pH level(s) and operatively associated with one or more of a Magnetic Field Exposure Mechanism(s) that are operatively associated with one or more of the Accumulation Area(s), and one or more of the Magnetic Field Exposure Mechanism(s) is configured to change a magnetic field strength affecting one or more portion(s) of the Solution by changing the operation of one or more of the Magnetic Field Generating Mechanism(s) to produce a change in one or more of the Magnetic Field Generating Mechanism(s) effect(s) in the range between and including no effect to full effect;

l. one or more of an Electric Field Generating Mechanism(s) configured to affect building of one or more object(s) from the Solution by affecting with an electric field, in one or more of the Accumulation Area(s), one or more of the spatial distribution of the Solution Component(s) in the Solution, the Solution temperature, and/or the Solution pH level(s) and operatively associated with one or more of an Electric Field Exposure Mechanism(s) that are operatively associated with one or more of the Accumulation Area(s), and one or more of the Electric Field Exposure Mechanism(s) is configured to change the electric field affecting one or more portion(s) of the Solution by changing the operation of one or more of the Electric Field Generating Mechanism(s) to produce a change in one or more of the Electric Field Generating Mechanism(s) effect(s) in the range between and including no effect to full effect;

m. one or more of a pH Adjusting Mechanism(s) configured to affect building of one or more object(s) from the Solution by affecting the Solution pH level(s) in one or more of the Accumulation Area(s) and operatively associated with one or more of a pH Exposure Mechanism(s) that are operatively associated with one or more of the Accumulation Area(s), and one or more of the pH Exposure Mechanism(s) is configured to change the pH of one or more portion(s) of the Solution by changing the operation of one or more of the pH Adjusting Mechanism(s) to produce a change in one or more of the pH Adjusting Mechanism(s) effect(s) in the range between and including no effect to full effect;

n. one or more of a Turbulence Mechanism(s) configured to affect building of one or more object(s) from the Solution by affecting a fluid motion characterized by chaotic changes in pressure and flow velocity in one or more of the Accumulation Area(s) and operatively associated with one or more of a Turbulence Exposure Mechanism(s) that are operatively associated with one or more of the Accumulation Area(s), and one or more of the Turbulence Exposure Mechanism(s) is configured to change the turbulence of one or more portion(s) of the Solution by changing the operation of one or more of the Turbulence Mechanism(s) to produce a change in one or more of the Turbulence Mechanism(s) effect(s) in the range between and including no effect to full effect; and/or o. one or more of a Microorganism Mechanism(s) configured to affect building of one or more object(s) from the Solution by affecting a carbonate-producing organism quantities in one or more of the Accumulation Area(s) and operatively associated with one or more of a Microorganism Exposure Mechanism(s) that are operatively associated with one or more of the Accumulation Area(s), and one or more of the Microorganism Exposure Mechanism(s) is configured to change the carbonate-producing organism quantities in one or more portion(s) of the Solution by changing the operation of one or more of the Microorganism Mechanism(s) to produce a change in one or more of the Microorganism Mechanism(s) effect(s) in the range between and including no effect to full effect.

2. The apparatus of claim 1, further comprising: one or more of a Residual Energy Mechanism(s) comprising one or more of a thermoelectric mechanism(s) and/or one or more of a heat exchange mechanism(s) configured to utilize residual energy to generate electricity, thermally insulate the apparatus, heat the Solution, transfer energy to one or more other process(es), and/or dissipate residual energy, and where one or more of the Residual Energy Mechanism(s) are operatively associated with one or more of the Removal Mechanism(s), one or more of the Accumulation Area(s), and/or one or more of the Delivery Mechanism(s); and one or more of the Delivery Mechanism(s) that further comprise(s) one or more of a Delivery Pretreatment Mechanism(s) operatively associated with zero or more of the Removal Mechanism(s) and where one or more of the Delivery Pretreatment Mechanism(s) comprises one or more of:

a. one or more of a heat exchanger(s) configured to use residual heat transferred from one or more of the Residual Energy Mechanism(s) to preheat the Solution prior to delivery to one or more of the Accumulation Area(s);

b. one or more of the Solution Flow Rate Mechanism(s) configured to affect building of one or more object(s) from the Solution by changing a rate and/or a volume of one or more of the Solution flow(s) within one or more of the Delivery Mechanism(s) and operatively associated with one or more of the Solution Flow Rate Exposure Mechanism(s) that are operatively associated with one or more of the Delivery Mechanism(s), and one or more of the Solution Flow Rate Exposure Mechanism(s) are configured to change one or more of the Solution Flow Rate Mechanism(s) operation(s) to alter one or more of the rate(s) and/or the volume(s) of one or more of the Solution flow(s) to produce a change in one or more of the Solution Flow Rate Mechanism(s) effect(s) in the range between and including no effect to full effect;

c. one or more of the Processing Time Mechanism(s) configured to affect building of one or more object(s) from the Solution by affecting reaction time for reagents in the Solution through changes in one or more of a Solution flow(s) rate and/or starting and/or stopping one or more of the Solution flow(s) within one or more of the Delivery Mechanism(s) and operatively associated with one or more of the Process Timing Exposure Mechanism(s) that are operatively associated with one or more of the Solution Flow Rate Exposure Mechanism(s) in one or more of the Delivery Mechanism(s), and one or more of the Process Timing Exposure Mechanism(s) are configured to signal one or more of the Solution Flow Rate Exposure Mechanism(s) to change one or more of the Solution Flow Rate Mechanism(s) to alter one or more of the Solution flow(s) rate and/or starting and/or stopping one or more of the Solution flow(s) to produce a change in one or more of the Process Timing Mechanism(s) effect(s) in the range between and including no effect to full effect;

d. one or more of the Pressure Mechanism(s) configured to affect building of one or more object(s) from the Solution by affecting Solution pressure in one or more parts of one or more Delivery Mechanism(s) and operatively associated with one or more of the Pressure Exposure Mechanism(s) that are operatively associated with one or more parts of the Delivery Mechanism(s) adjacent to the Solution, and one or more of the Pressure Exposure Mechanism(s) are configured to change one or more of the Solution pressure(s) by changing the one or more of the Pressure Mechanism(s) operation to produce a change in one or more of the Pressure Mechanism(s) effect(s) in the range between and including no effect to full effect;

e. one or more of the Injection Mechanism(s) configured to affect building of one or more object(s) from the Solution by injecting into the Solution one or more of the Injectables that affect the relative or absolute concentrations of one or more of the Solution component(s) within one or more of the Delivery Mechanism(s) and with one or more of the Injection Mechanism(s) being operatively associated with one or more of the Injection Exposure Mechanism(s) that are operatively associated with one or more Delivery Mechanism(s), and one or more of the Injection Exposure Mechanism(s) is configured to cause one or more of the Injection Mechanism(s) to selectively deliver one or more of the Injectable(s) to the Solution to produce a change in one or more of the Injection Mechanism(s) effect(s) in the range between and including no effect to full effect;

f. one or more of the Heating Mechanism(s) configured to affect building of one or more object(s) from the Solution by affecting the Solution temperature within one or more of the Delivery Mechanism(s) and operatively associated with one or more of the Heating Exposure Mechanism(s) that is operatively associated with one or more Delivery Mechanism(s), and one or more of the Heating Exposure Mechanism(s) is configured to change the temperature of one or more portion(s) of the Solution by changing the operation of one or more of the Heating Mechanism(s) to produce a change in one or more of the Heating Mechanism(s) effect(s) in the range between and including no effect to full effect;

g. one or more of the Magnetic Field Generating Mechanism(s) configured to affect building of one or more object(s) from the Solution by affecting with a magnetic field the spatial distribution of reactant(s) in the Solution, the Solution temperature, and the Solution pH level(s) within one or more of the Delivery Mechanism(s) and operatively associated with one or more of the Magnetic Field Exposure Mechanism(s) that are operatively associated with one or more Delivery Mechanism(s), and one or more of the Magnetic Field Exposure Mechanism(s) is configured to change a magnetic field strength affecting one or more portion(s) of the Solution by changing the operation of one or more of the Magnetic Field Generating Mechanism(s) to produce a change in one or more of the Magnetic Field Generating Mechanism(s) effect(s) in the range between and including no effect to full effect;

h. one or more of the Electric Field Generating Mechanism(s) configured to affect building of one or more object(s) from the Solution by affecting with an electric field the spatial distribution of reactant(s) in the Solution, the Solution temperature, and the Solution pH level(s) within one or more of the Delivery Mechanism(s) and operatively associated with one or more of the Electric Field Exposure Mechanism(s) that are operatively associated with one or more Delivery Mechanism(s), and one or more of the Electric Field Exposure Mechanism(s) is configured to change the electric field affecting one or more portion(s) of the Solution by changing the operation of one or more of the Electric Field Generating Mechanism(s) to produce a change in one or more of the Electric Field Generating Mechanism(s) effect(s) in the range between and including no effect to full effect;

i. one or more of the pH Adjusting Mechanism(s) configured to affect building of one or more object(s) from the Solution by affecting the Solution pH levels in one or more parts of the Delivery Mechanism(s) and operatively associated with one or more of the pH Exposure Mechanism(s) that are operatively associated with one or more of the Delivery Mechanism(s), and one or more of the pH Exposure Mechanism(s) is configured to change the pH of one or more portion(s) of the Solution by changing the operation of one or more of the pH Adjusting Mechanism(s) to produce a change in one or more of the pH Adjusting Mechanism(s) effect(s) in the range between and including no effect to full effect;

j. one or more of the Turbulence Mechanism(s) configured to affect building of one or more object(s) from the Solution by affecting a fluid motion characterized by chaotic changes in pressure and flow velocity in one or more of the Delivery Mechanism(s) and operatively associated with one or more of the Turbulence Exposure Mechanism(s) that are operatively associated with one or more of the Delivery Mechanism(s), and one or more of the Turbulence Exposure Mechanism(s) is configured to change the turbulence of one or more portion(s) of the Solution by changing the operation of one or more of the Turbulence Mechanism(s) to produce a change in one or more of the Turbulence Mechanism(s) effect(s) in the range between and including no effect to full effect; and/or k. one or more of the Microorganism Mechanism(s) configured to affect building of one or more object(s) from the Solution by affecting a carbonate-producing organism quantities in the Solution in one or more of the Delivery Mechanism(s) and operatively associated with one or more of the Microorganism Exposure Mechanism(s) that are operatively associated with one or more of the Delivery Mechanism(s), and one or more of the Microorganism Exposure Mechanism(s) is configured to change the carbonate-producing organism quantities in one or more portion(s) of the Solution by changing the operation of one or more of the Microorganism Mechanism(s) to produce a change in one or more of the Microorganism Mechanism(s) effect(s) in the range between and including no effect to full effect.

3. The apparatus of claim 2, further comprising: one or more of a Buffer(s) configured to inhibit corrosion, inhibit deposition of the Solution component(s) in undesirable locations, and/or serve as an intermediary layer between the Solution and one or more portions of one or more mechanism(s), component(s), and/or the Accumulation Area(s) of the apparatus.

4. The apparatus of claim 3, further comprising: one or more of a Support(s) operatively associated with two or more of: one or more of the Delivery Mechanism(s), one or more of the Stimulation and Exposure Mechanism(s), one or more of the Accumulation Area(s), and/or one or more of the Removal Mechanism(s).

5. The apparatus of claim 4, further comprising: one or more of a Process Cell(s) comprising one or more of the Stimulation and Exposure Mechanism(s) and bound by zero or more of a wall(s) and separated from the Solution by zero or more of the Buffer(s) and where each of the Process Cell(s) is arranged adjacent to other of the Process Cell(s) to form a Process Grid comprised of the Process Cell(s) configured for the Process Cell(s) movement along a Z axis perpendicular to the Accumulation Area(s) X and Y axes, and that the Process Grid is operatively associated with one or more of the Accumulation Area(s) and configured to affect building of one or more object(s) by uniformly, selectively, incrementally, differentially, and/or simultaneously synergistically stimulating the Solution in one or more parts of the Accumulation Area(s) by selective, incremental, differential, and/or simultaneous activation of one or more of the Stimulation and Exposure Mechanism(s) in one or more of the Process Cell(s).

6. The apparatus of claim 5, further comprising: one or more of a Measurement Device(s) configured to collect one or more of a Measurement Data comprising one or more of data pertaining to any aspect of the apparatus, apparatus operation, apparatus output, and/or internal and/or external operating environment, and where the Measurement Device(s) are operatively associated with one or more of an Apparatus Component(s) comprising one or more of the mechanism(s), one or more of the Support(s), one or more of the component(s), and/or one or more of the Accumulation Area(s) of the apparatus and operatively associated with one or more of a Controller(s) that are operatively associated with one or more of the Apparatus Component(s) and configured to adjust the Apparatus Component(s) to affect one or more of the Apparatus Component(s)' functions in one or more portions of the Apparatus Component(s) and/or one or more portions of the Solution for building one or more object(s).

7. The apparatus of claim 6, further comprising: the plurality of the Process Cells constitutes the Process Grid of a fixed or variable shape.

8. The apparatus of claim 7, further comprising: one or more of: the Solution, one or more of the Exposure Mechanism(s), one or more of the Stimulation & Exposure Mechanism(s), and/or one or more of the Accumulation Area(s) configured to move on one or more of the X, Y, and/or Z axes.

9. The apparatus of claim 8, further comprising: the apparatus and/or one or more of the Apparatus Components configured to be submersible in the Solution.

10. The apparatus of claim 9, further comprising: one or more of the Removal Mechanism(s) that further comprises one or more of a Removal Pretreatment Mechanism(s) comprising one or more of a selective removal mechanism(s) configured to selectively remove one or more particles, catalysts, gasses, solutes, and/or other components of the liquid and where one or more of the Removal Pretreatment Mechanism(s) is operatively associated with one or more of the Removal Mechanism(s).

11. The apparatus of claim 10, further comprises: one or more of the Accumulation Area(s) that comprises one or more of a form(s) of one or more of a shape(s) to limit accumulation of one or more of the Solution component(s) deposited from the Solution to the shape of the desired object(s) and in or on which the object is built.

12. The apparatus of claim 10, further comprises: one or more of a computer(s) that receives one or more of the Measurement Data, calculates adjustments, and sends adjustment commands to one or more of the Controller(s).

13. The apparatus of claim 1, further comprises: a Solution that comprises a naturally occurring solution.

14. A method of simultaneously building one or more object(s) composed in whole or one or more part(s) of sequestered carbon dioxide, comprising: moving a Solution, comprising carbon dioxide, carbonates and/or reactants producing carbonates and/or bicarbonates and/or reactants producing bicarbonates, and/or hydroxide salts and/or reactants producing hydroxide salts by one or more of a Delivery Mechanism(s) submerged in the Solution and using a Solution's kinetic energy to position one or more of the Delivery Mechanism(s) intake opening(s) to receive the Solution in the Delivery Mechanism(s) that delivers the Solution to one or more of an Accumulation Area(s); uniformly, selectively, incrementally, differentially, and/or simultaneously synergistically stimulating the Solution, using one or more of a Stimulation and Exposure Method(s) comprising:

a. adjusting one or more of a Solution Flow Rate Mechanism(s) and/or one or more of a Solution Flow(s) Rate Exposure Mechanism(s) to affect building of one or more object(s) from the Solution by changing a rate and/or a volume of one or more of a Solution flow(s) in one or more of the Accumulation Area(s) through changing one or more of the Solution Flow Rate Mechanism(s) effect in the range between and including no effect to full effect;

b. adjusting one or more of a Process Timing Mechanism(s) and/or one or more of a Process Timing Exposure Mechanism(s) to signal one or more of the Solution Flow Rate Exposure Mechanism(s) to affect building of one or more object(s) from the Solution by affecting reaction time for reagents in one or more of a the Solution flow(s) in one or more of the Accumulation Area(s) through changes in one or more of the Solution flow(s) rate and/or starting and/or stopping the Solution flow(s) by changing one or more of the Solution Flow Rate Mechanism(s) effect(s) in the range between and including no effect to full effect;

c. adjusting one or more of a Pressure Mechanism(s) and/or one or more of a Pressure Exposure Mechanism(s) to affect building of one or more object(s) from the Solution by affecting the Solution pressure in one or more parts of the Solution by changing one or more of the Pressure Mechanism(s) effect in the range between and including no effect to full effect;

d. adjusting one or more of an Injection Mechanism(s) to inject one or more of an Injectable(s) comprising reagents, microorganisms, supernatant liquid, and/or Solution and/or one or more of an Injection Exposure Mechanism(s) to affect building of one or more object(s) from the Solution by affecting the relative or absolute concentrations of one or more of a Solution Component(s) in one or more of the Accumulation Area(s) through changing one or more of the Injection Mechanism(s) effect in the range between and including no effect to full effect;

e. adjusting one or more of a Heating Mechanism(s) and/or one or more of a Heating Exposure Mechanism(s) to affect building of one or more object(s) from the Solution by affecting the Solution temperature in one or more of the Accumulation Area(s) by changing one or more of the Heating Mechanism(s) effect in the range between and including no effect to full effect;

f. adjusting one or more of a Magnetic Field Generating Mechanism(s) and/or one or more of a Magnetic Field Exposure Mechanism(s) to affect building of one or more object(s) from the Solution by affecting with a magnetic field, in one or more of the Accumulation Area(s), one or more of a spatial distribution of the Solution Component(s) in the Solution, the Solution temperature, and/or the Solution pH level(s) through changing one or more of the Magnetic Field Generating Mechanism(s) effect in the range between and including no effect to full effect;

g. adjusting one or more of an Electric Field Generating Mechanism(s) and/or one or more of an Electric Field Exposure Mechanism(s) to affect building of one or more object(s) from the Solution by affecting with an electric field, in one or more of the Accumulation Area(s), one or more of the spatial distribution of the Solution Component(s) in the Solution, the Solution temperature, and/or the Solution pH level(s) by changing one or more of the Electric Field Generating Mechanism(s) effect in the range between and including no effect to full effect;

h. adjusting one or more of a pH Adjusting Mechanism(s) and/or one or more of a pH Exposure Mechanism(s) to affect building of one or more object(s) from the Solution by affecting the Solution pH levels in one or more of the Accumulation Area(s) by changing one or more of the pH Adjusting Mechanism(s) effect in the range between and including no effect to full effect;

i. adjusting one or more of a Turbulence Mechanism(s) and/or one or more of a Turbulence Exposure Mechanism(s) to affect building of one or more object(s) from the Solution by affecting a fluid motion characterized by chaotic changes in pressure and flow velocity in one or more of the Accumulation Area(s) by changing one or more of the Turbulence Mechanism(s) effect in the range between and including no effect to full effect; and/or j. adjusting one or more of a Microorganism Mechanism(s) and/or one or more of a Microorganism Exposure Mechanism(s) to affect building of one or more object(s) from the Solution by affecting a carbonate-producing organism quantities in one or more of the Accumulation Area(s) by changing one or more of the Microorganism Mechanism(s) effect in the range between and including no effect to full effect;

so that the Stimulation and Exposure Method(s) affect the building, in one or more of the Accumulation Area(s), one or more object(s) from the Solution; using residual energy in one or more of a Residual Energy Mechanism(s) comprising one or more of a thermoelectric mechanism(s) and/or one or more of a heat exchange mechanism(s) configured to utilize residual energy to generate electricity, heat the Solution, transfer energy to one or more other process(es), dissipate residual energy, and/or thermally insulate an Apparatus comprising one or more of the Delivery Mechanism, one or more of a mechanism(s) configured to perform the Stimulation and Exposure Method(s), one or more of a Removal Mechanism(s), and/or one or more of the Accumulation Area(s); selectively removing zero or more of a Selectively Removed Items comprising particles, catalysts, gasses, solutes, and/or other components of a supernatant liquid with one or more of a Removal Pretreatment Mechanism(s); reusing one or more of the Selectively Removed Items in building one or more of the object(s) and/or transferring the Selectively Removed Items to one or more other uses; and removing a Discharge comprising one or more liquid(s), gas (ses), and/or solid(s) from one or more of the Accumulation Area(s) by one or more of the Removal Mechanism(s).

15. The method of claim 14, further comprising: one or more of the Delivery Mechanism(s) pretreat the Solution using one or more of the Stimulation and Exposure Method(s) to uniformly, selectively, incrementally, differentially, and/or simultaneously synergistically stimulate one or more portion(s) of the Solution prior to delivering the Solution to one or more of the Accumulation Area(s).

16. The method of claim 15, further comprising: operation of the Apparatus adjusted by one or more of a controller(s) using one or more of a Measurement Data comprising one or more of data pertaining to any aspect of the Apparatus, Apparatus operation, Apparatus output, and/or internal and/or external operating environment and collected from one or more of a Measurement Device(s) in order to facilitate operation of the Apparatus as described herein.

17. The method of claim 16, further comprising: a layer forming process comprising one or more of the Delivery Mechanism(s) selectively adds the Solution to one or more of the Accumulation Area(s); one or more of a Process Cell(s), comprising one or more mechanism(s) configured to perform the Stimulation and Exposure Method(s) and bound by a zero or more wall(s) and separated from the Solution by a zero or more Buffer(s), uniformly, selectively, incrementally, differentially, and/or simultaneously synergistically stimulates through one or more of the Stimulation and Exposure Method(s) one or more portion(s) of the Solution to cause the deposition of a layer of one or more of the Solution component(s) in one or more of the Accumulation Area(s); one or more of the Removal Mechanism(s) removes the liquid, gasses, and/or solids; this layer forming process is repeated to deposit another layer of one or more of the Solution components(s); the additional layer is adhered to the prior layer by selective, incremental, differential, and/or simultaneous synergistic stimulation of the Solution through one or more of the Stimulation and Exposure Method(s); and the layer formation process repeats to produce a plurality of successively adhered layers of one or more of the Solution component(s) that form one or more of the object(s); and selectively removing one or more component(s) of the Discharge for reuse in the Apparatus, disposal, and/or one or more uses in one or more other process(es).

18. The method of claim 17, further comprising: one or more of a Measurement Device(s) collects one or more of the Measurement Data; one or more of a Measurement Device(s) transmits one or more of the Measurement Data to one or more of the controller(s) that uses one or more of the Measurement Data to affect changes in the performance of one or more method step(s) and/or one or more of an Apparatus Component(s) comprising: one or more of the mechanism(s) configured to perform one or more of the Stimulation and Exposure Method(s); one or more of the Delivery Mechanism(s); one or more of a Support(s) that are operatively associated with two or more of: one or more of the Delivery Mechanism(s), one or more of the mechanism(s) configured to perform the Stimulation and Exposure Method(s), one or more of the Accumulation Area(s), and/or one or more of the Removal Mechanism(s); one or more of the Process Cell(s); one or more of the Accumulation Area(s); and/or one or more of the Removal Mechanism(s) to produce the one or more of the object(s).

19. The method of claim 18, further comprising: a computational mechanism generates data representing cross-sections of one or more of the object(s) to be formed; one or more of the Delivery Mechanism(s) adds the Solution to one or more of the Accumulation Area(s); one or more of the Process Cell(s) uniformly, selectively, incrementally, differentially, and/or simultaneously synergistically stimulates through one or more of the Stimulation and Exposure Method(s) one or more portion(s) of the Solution causing the precipitation of a layer of one or more of a precipitate(s) from the Solution in one or more of the Accumulation Area(s) directed by the cross-sectional data defining the object(s) to be formed; one or more of the Measurement Device(s) collect one or more of the Measurement Data; sending one or more of the Measurement Data to one or more of the controller(s) operatively associated with one or more of the Support(s) and/or other of the Apparatus mechanisms; detecting the position of the Solution and/or one or more of the layer surface(s) and collecting one or more of the Measurement Data; adjusting the function and/or position(s) of one or more of the Delivery Mechanism(s), one or more of the Process Cell(s), one or more of the Accumulation Area(s), one or more of the Removal Mechanism(s), and/or one or more of the adjustment mechanism(s) by using one or more of the Measurement Data to affect one or more of the Support(s) and/or function of one or more of the Apparatus mechanisms to affect the Solution placement and/or deposition of one or more of the Solution component(s) onto one or more of the layer(s) being constructed; one or more of the Removal Mechanism(s) removes the supernatant liquid; this layer forming process repeats to deposit another layer of one or more of the Solution component(s) depositing from the Solution as directed by the cross-sectional data defining one or more of the object(s) to be formed; adhering the additional layer to the prior layer by uniformly, selectively, incrementally, differentially, and/or simultaneously synergistic stimulation of the Solution through one or more of the Stimulation and Exposure Method(s); and the layer formation process repeats to produce a plurality of successively adhered layers of one or more of the Solution component(s) as directed by the cross-sectional data defining the object(s) being formed.

* * * * *